US010662208B2

United States Patent
Bousquie et al.

(10) Patent No.: US 10,662,208 B2
(45) Date of Patent: May 26, 2020

(54) HYDROSILYLATION PROCESS USING A GERMYLENE-BASED ORGANIC CATALYST

(71) Applicants: Elkem Silicones France SAS, Lyons (FR); Centre National de la Recherche Scientifique, Paris (FR)

(72) Inventors: Magali Bousquie, Lyons (FR); Yanli Mao, Shanghai (CN); Raphael Mirgalet, Toulouse (FR); Tsuyoshi Kato, Toulouse (FR); Antoine Baceiredo, Toulouse (FR)

(73) Assignees: Elkem Silicones France SAS, Lyons (FR); Centre National de la Recherche Scientifique (CNRS, Paris (FR)

( * ) Notice: Subject to any disclaimer, the term of this patent is extended or adjusted under 35 U.S.C. 154(b) by 0 days.

(21) Appl. No.: 16/099,743

(22) PCT Filed: May 5, 2017

(86) PCT No.: PCT/FR2017/000082
§ 371 (c)(1),
(2) Date: Nov. 8, 2018

(87) PCT Pub. No.: WO2017/194848
PCT Pub. Date: Nov. 16, 2017

(65) Prior Publication Data
US 2019/0177343 A1    Jun. 13, 2019

(30) Foreign Application Priority Data

May 10, 2016    (FR) ...................................... 16 00757

(51) Int. Cl.
| | |
|---|---|
| *C07F 7/18* | (2006.01) |
| *C07F 7/30* | (2006.01) |
| *C07F 9/6584* | (2006.01) |
| *C07F 9/535* | (2006.01) |
| *B01J 31/22* | (2006.01) |

(52) U.S. Cl.
CPC ............ *C07F 7/188* (2013.01); *C07F 7/1804* (2013.01); *C07F 7/30* (2013.01); *C07F 9/5355* (2013.01); *C07F 9/65848* (2013.01); *B01J 31/2295* (2013.01); *B01J 2231/323* (2013.01); *B01J 2531/0238* (2013.01); *B01J 2531/40* (2013.01)

(58) Field of Classification Search
None
See application file for complete search history.

(56) References Cited

FOREIGN PATENT DOCUMENTS

WO            01/42258 A1    6/2001

OTHER PUBLICATIONS

Jana et al., Dalton Trans., 2010, 39, 6217-6220. (Year: 2010).*
Jana et al., "Reactivity of germanium(II) hydride with nitrous oxide, trimethylsilyl azide, ketones, and alkynes and the reaction of a methyl analogue with trimethylsilyl diazomethane" Dalton Transactions: The International Journal for Inorganic, Organometallic and Bioinorganic Chemistry, vol. 39, issue 1, pp. 132-138 (2010).
Choong et al., "Synthesis, Characterization, and Reactivity of an N-Heterocyclic Germanium(II) Hydride: Reversible Hydrogermylation of a Phosphaallcyne," Organometallics, vol. 30, issue 20, pp. 5543-5550 (2011).
Hadlington et al., "Low Coordinate Germanium(II) and Tin(II) Hydride Complexes: Efficient Catalysts for the Hydroboration of Carbonyl Compounds," Journal of the American Chemical Society, vol. 136, issue 8, pp. 3028-3031 (2014).
Pineda et al., "Stable Monomeric Germanium(II) and Tin(II) Compounds with Terminal Hydrides," Angewandte Chemie International Edition, vol. 45, issue 15, pp. 2602-2605 (2006).
Takagi et al., "Theoretical Study of Reactivity of Ge(II)-hydride Compund: Comparison with Rh(I)-Hydride Complex and Prediction of Full Catalytic Cycle by Ge(II)-hydride," Journal of the American Chemical Society, vol. 135, pp. 8955-8965 (2013).
PCT International Search Report for PCT/FR2017/000082, dated Aug. 2, 2017.

* cited by examiner

*Primary Examiner* — Clinton A Brooks
*Assistant Examiner* — Kofi Adzamli
(74) *Attorney, Agent, or Firm* — McBee Moore & Vanik IP, LLC

(57) ABSTRACT

The invention relates to a method for hydrosilylating an unsaturated compound comprising at least one ketone function, one aldehyde function, one alkene function and/or one alkyne function, with a compound comprising at least one hydrogenosilyl function, using an organic germanium catalyst.

7 Claims, No Drawings

HYDROSILYLATION PROCESS USING A GERMYLENE-BASED ORGANIC CATALYST

CROSS-REFERENCE TO RELATED APPLICATIONS

This application is a National Stage entry of International Application No. PCT/FR2017/000082, filed May 5, 2017, which claims priority to French Patent Application No. 1600757, filed May 10, 2016.

BACKGROUND

Field

The present invention relates to a process for the hydrosilylation of an unsaturated compound with a compound comprising at least one hydrogenosilyl function, catalyzed with organogermanium compounds. The invention also relates to said organogermanium compounds.

Description of Related Art

During a hydrosilylation reaction (also known as polyaddition), an unsaturated compound, i.e. a compound comprising at least one unsaturation of double or triple bond type, reacts with a compound comprising at least one hydrogenosilyl function, i.e. a hydrogen atom bonded to a silicon atom. This reaction may be described, for example, in the case of an unsaturation of C=O type such as that borne by ketone or aldehyde compounds, by:

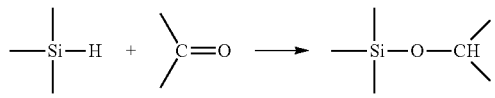

or, in the case of an unsaturation of alkene type, by:

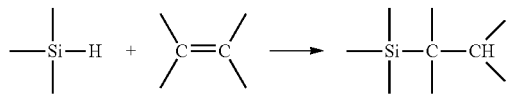

or alternatively, in the case of an unsaturation of alkyne type, by:

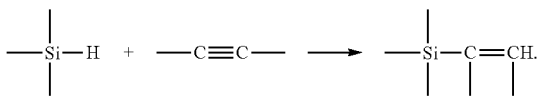

The hydrosilylation reaction of unsaturated compounds is performed by catalysis, using an organometallic catalyst. Currently, the organometallic catalyst that is suitable for this reaction is a platinum catalyst. Thus, the majority of the industrial hydrosilylation processes, in particular of alkenes, are catalyzed by the platinum Karstedt complex, of general formula $Pt_2(divinyltetramethyldisiloxane)_3$ (abbreviated as $Pt_2(DVTMS)_3$):

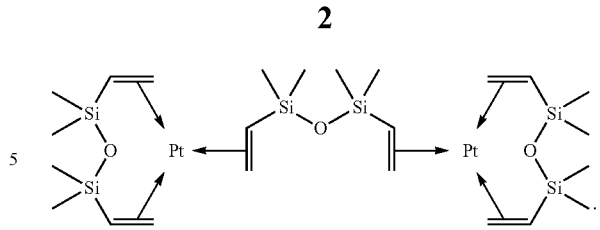

At the start of the 2000s, the preparation of platinum-carbene complexes of general formula:

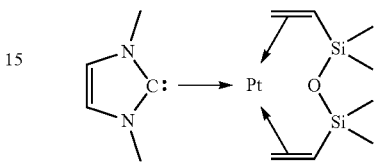

afforded access to more stable catalysts (see, for example, international patent application WO 01/42258).

However, the use of platinum organometallic catalysts is still problematic. It is an expensive metal that is becoming harder to find, and the price of which fluctuates enormously. It is therefore difficult to use at the industrial scale. It is thus desired to minimize the amount of catalyst required for the reaction, without, however, reducing the yield or the reaction rate. Moreover, it is desired to have available a catalyst that is stable over the course of the reaction. It has been found that, during the catalyzed reaction, platinum metal can precipitate, leading to the formation of insoluble colloids in the reaction medium. The catalyst is then less active. Furthermore, these colloids form cloudiness in the reaction medium, and the products obtained are not esthetically satisfying because they are colored.

In an increasingly competitive worldwide context in which the environment takes an increasingly important place each day, developing hydrosilylation processes catalyzed with more ecological and economical compounds is greatly desired. Metal-free organic catalysis is considered a promising approach for implementing these green chemistry concepts.

However, organic catalysts are unstable in air and degrade rapidly, which makes them particularly difficult to use. This is the case, for example, for germanium hydride organic compounds, which are known to degrade rapidly in air (*Angew. Chem. Int. Ed.* 2006, 45, 2602-2605).

In addition, the reactivity of these organic catalysts is often poorer than that of organometallic derivatives.

Thus, one of the objects of the present invention is to propose a hydrosilylation process catalyzed with a novel type of organic compound which is stable in air and in the reaction medium, and which has good reactivity.

The inventors of the present patent application have developed a hydrosilylation process catalyzed with organogermanium compounds. They have demonstrated, entirely surprisingly, that the particular cyclic structure of these compounds makes it possible to obtain organogermanium compounds which are stable in air and in the reaction medium, which have good reactivity with respect to the hydrosilylation reaction and, consequently, which can catalyze said hydrosilylation process.

The reactivity of a tri-coordinate germanium hydride, $(^{Dip}NacNac)GeH$, formed the subject of a theoretical projection by Takagi et al. (*J. Am. Chem. Soc.,* 2013, 135, 8955-8965) by the density functional theory (DFT calculation). The calculations appear to indicate that, theoretically, tri-coordinate germanium hydride might be a catalyst for a ketone hydrosilylation reaction. However, the subsequent experiments performed by Hadlington et al. (*J. Am. Chem. Soc.*, 2014, 136, 3028-3031) revealed that the tri-coordinate germanium hydride ($^{Dip}$NacNac)GeH reacts only with activated ketones, and that its reactivity is less than that of compounds of bi-coordinate germanium hydride type. Hadlington et al. explains that the bi-coordinate compound is more reactive since it is less stable than the tri-coordinate compound. Thus, Hadlington et al. suggests that increasing the stability of the germanium hydrides would bring about a reduction in their reactivity.

The inventors of the present patent application have, however, demonstrated that certain organogermanium compounds of specific formula, which are structurally stabilized, can efficiently catalyze hydrosilylation processes.

SUMMARY

One subject of the present invention is a process for the hydrosilylation of an unsaturated compound (A) comprising at least one ketone function, aldehyde function, alkene function and/or alkyne function, with a compound (B) comprising at least one hydrogenosilyl function, said process being characterized in that it is catalyzed with an organic compound (C) represented by formula (1):

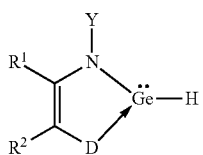

(1)

in which:
the symbols "Ge", "N" and "H" represent, respectively, a germanium atom, a nitrogen atom and a hydrogen atom,
the symbol Y is an alkyl group containing from 1 to 12 carbon atoms or an aryl group containing from 6 to 30 carbon atoms, and preferably, Y is an aryl group containing from 6 to 30 atoms,
the groups $R^1$ and $R^2$, which may be identical or different, represent a hydrogen atom, an alkyl group containing from 1 to 30 carbon atoms, an alkenyl group containing from 2 to 12 carbon atoms, an aryl group containing from 6 to 18 carbon atoms, $R^1$ and $R^2$ possibly being connected via a covalent bond so as to form a ring or a bicycle, which is optionally substituted, containing from 5 to 8 atoms, and preferably $R^1$ and $R^2$ are connected via a covalent bond so as to form a ring or a bicycle, which is optionally substituted, containing from 5 to 8 carbon atoms,
the symbol "↗" represents a covalent coordination bond due to the presence in the ligand D of a lone pair of electrons, and
D is a ligand which is a donor group including a lone pair of electrons, and preferably D is a ligand which is a phosphine, sulfide or iminophosphorane group including a lone pair of electrons.

In addition, a subject of the invention is also an organic compound (C) represented by formula 1:

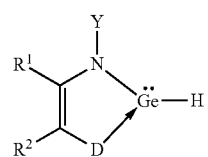

(1)

in which:
the symbols "Ge", "N" and "H" represent, respectively, a germanium atom, a nitrogen atom and a hydrogen atom,
the symbol Y is an alkyl group containing from 1 to 12 carbon atoms or an aryl group containing from 6 to 18 carbon atoms, and preferably, Y is an aryl group containing from 6 to 18 atoms,
the groups $R^1$ and $R^2$, which may be identical or different, represent a hydrogen atom, an alkyl group containing from 1 to 20 carbon atoms, an alkenyl group containing from 2 to 12 carbon atoms, an aryl group containing from 6 to 18 carbon atoms, $R^1$ and $R^2$ possibly being connected via a covalent bond so as to form a ring or a bicycle, which is optionally substituted, containing from 5 to 8 atoms, and preferably $R^1$ and $R^2$ are connected via a covalent bond so as to form a ring or a bicycle, which is optionally substituted, containing from 5 to 8 carbon atoms,
the symbol "↗" represents a covalent coordination bond due to the presence in the ligand D of a lone pair of electrons, and
D is a ligand which is a donor group including a lone pair of electrons, and preferably D is a ligand which is a phosphine, sulfide or iminophosphorane group including a lone pair of electrons.

These organic compounds are particularly suitable for use as hydrosilylation catalyst, which also constitutes a subject of the present invention.

Finally, a subject of the invention is a composition comprising:
at least one unsaturated compound (A) comprising at least one ketone function, aldehyde function, alkene function and/or alkyne function,
at least one compound (B) comprising at least one hydrogenosilyl function, and
a catalyst chosen from the organic compounds (C) of formula 1 as defined above.

DETAILED DESCRIPTION OF A PREFERRED EMBODIMENT

Process

According to a first aspect, the present invention relates to a process for the hydrosilylation of an unsaturated compound (A), i.e. a compound comprising at least one unsaturation of double or triple bond type, said unsaturation being borne by at least one ketone function, aldehyde function, alkene function and/or alkyne function, preferably borne by at least one alkene function and/or at least one alkyne function, with a compound (B) comprising at least one hydrogenosilyl function, said process being characterized in that it is catalyzed with at least one organic compound (C) represented by formula 1:

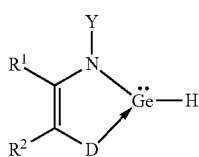

(1)

in which:
the symbols "Ge", "N" and "H" represent, respectively, a germanium atom, a nitrogen atom and a hydrogen atom,
the symbol Y is an alkyl group containing from 1 to 12 carbon atoms or an aryl group containing from 6 to 30 carbon atoms, and preferably, Y is an aryl group containing from 6 to 30 atoms,
the groups $R^1$ and $R^2$, which may be identical or different, represent a hydrogen atom, an alkyl group containing from 1 to 30 carbon atoms, an alkenyl group containing from 2 to 12 carbon atoms, an aryl group containing from 6 to 18 carbon atoms, $R^1$ and $R^2$ possibly being connected via a covalent bond so as to form a ring or a bicycle, which is optionally substituted, containing from 5 to 8 atoms, and preferably $R^1$ and $R^2$ are connected via a covalent bond so as to form a ring or a bicycle, which is optionally substituted, containing from 5 to 8 carbon atoms,
the symbol " ⫽ " represents a covalent coordination bond due to the presence in the ligand D of a lone pair of electrons, and
D is a ligand which is a donor group including a lone pair of electrons, and preferably D is a ligand which is a phosphine, sulfide or iminophosphorane group including a lone pair of electrons.

The organic compound (C) is characterized in that it comprises a cyclic structure around the germanium atom and a group which donates an electron pair to the germanium atom. The Applicant has demonstrated that this particular cyclic structure makes it possible to stabilize the organic compound (C) without, however, impairing its reactivity.

Without wishing to be bound by any theory, the ligand D according to the invention appears to allow intramolecular complexation of the germanium atom in the organic compound (C), thus improving its stability in air and in the reaction medium.

In the case of the organic compound (C), the germanium atom is bonded to a nitrogen atom and to a hydrogen atom via covalent bonds, and to the donor group via a covalent coordination bond.

According to the invention, the term "alkyl" means a linear or branched saturated hydrocarbon-based chain containing from 1 to 30 carbon atoms and preferably from 1 to 8 carbon atoms. An alkyl group may be chosen from methyl, ethyl, isopropyl, n-propyl, tert-butyl, isobutyl, n-butyl, n-pentyl, isoamyl and 1,1-dimethylpropyl groups.

According to the invention, the term "halogen atom" means an atom chosen from the group formed by fluorine, chlorine, bromine and iodine.

According to the invention, the term "alkenyl" means a linear or branched unsaturated hydrocarbon-based chain containing from 2 to 12 carbon atoms.

According to the invention, the term "haloalkyl" means an alkyl group as defined above substituted with a halogen atom as defined above.

According to the invention, the term "cycloalkyl" means a saturated monocyclic or polycyclic, preferably monocyclic or bicyclic, hydrocarbon-based group containing from 3 to 20 carbon atoms, preferably from 3 to 8 carbon atoms. When the cycloalkyl group is polycyclic, the multiple cyclic nuclei may be attached to each other via a covalent bond and/or via a spirane atom and/or may be fused with each other. A cycloalkyl group may be chosen from cyclopropyl, cyclobutyl, cyclopentyl, cyclohexyl, cycloheptyl, cyclooctyl, adamantane and norbomane groups.

According to the invention, the term "cycloalkyl-alkyl" means a cycloalkyl group as defined above substituted with an alkyl group also as defined above.

According to the invention, the term "aryl" means a monocyclic or polycyclic aromatic hydrocarbon-based group containing from 6 to 30 carbon atoms. An aryl group may be chosen from phenyl, naphthyl, anthracenyl and phenanthryl groups.

According to the invention, the term "aryl-alkyl" means an aryl group as defined above substituted with an alkyl group also as defined above.

According to a particularly preferred embodiment of the invention, the process according to the invention is characterized in that the ligand D is chosen from the group formed from:
a phosphine group of formula (2) below:

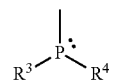

(2)

in which:
the groups $R^3$ and $R^4$, which may be identical or different, represent a hydrogen atom, a halogen atom, a haloalkyl group containing from 1 to 20 carbon atoms, an alkyl group containing from 1 to 20 carbon atoms and optionally one or more nitrogen or silicon atoms, a cycloalkyl group containing from 5 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms, and when $R^3$ and $R^4$ are alkyl groups containing from 1 to 20 carbon atoms and optionally one or more nitrogen and/or silicon atoms, said groups $R^3$ and $R^4$ may be linked via a covalent bond so as to form, with the phosphorus atom, a ring of 4 or 5 atoms optionally substituted with one or more alkyl groups containing from 1 to 10 carbon atoms;
a sulfide group of formula (3) below:

(3)

in which:
the group $R^5$ represents a hydrogen atom, a halogen atom, an alkyl or haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; R⁵ also possibly forming, with the atoms to which it is attached, a monocyclic or polycyclic ring consisting of 3 to 20 atoms; and an iminophosphorane group of formula (4) below:

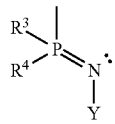
(4)

in which:
the symbol Y represents an alkyl group containing from 1 to 12 carbon atoms or an aryl group containing from 6 to 18 carbon atoms,
the groups R³ and R⁴, which may be identical or different, represent a hydrogen atom, a halogen atom, an alkyl or a haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; with R³ and R⁴ also possibly forming, either together or with the atoms to which they are attached, a monocyclic or polycyclic ring consisting of 3 to 20 atoms and possibly containing one or more nitrogen or silicon atoms.

According to an advantageous embodiment, the ligand D is a phosphine group of formula (5) or (6) below:

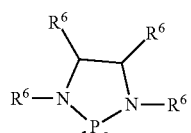
(5)

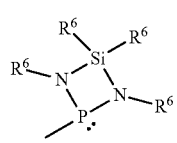
(6)

in which the groups R⁶ are identical or different and represent an alkyl group containing from 1 to 10 carbon atoms.

It is particularly advantageous to choose the organic compound C from the group formed by the compounds of formulae (7), (8), (9), (10), (11), (12) and (13):

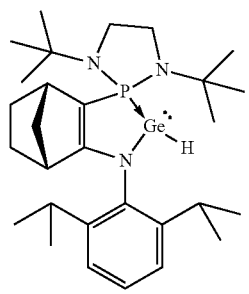
(7)

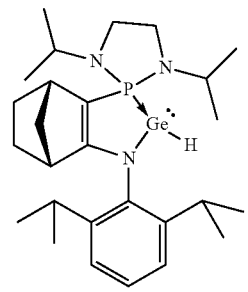
(8)

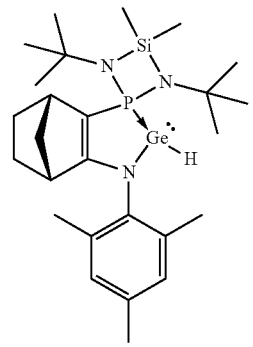
(9)

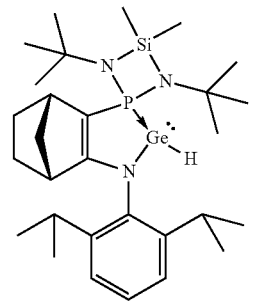
(10)

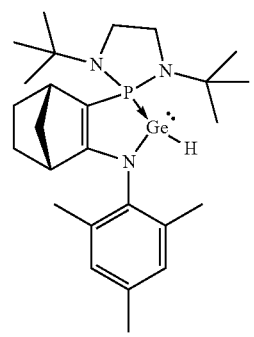
(11)

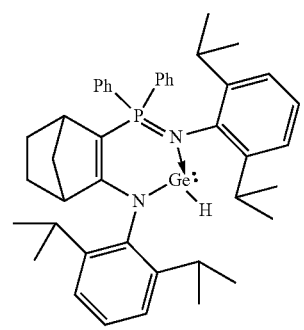
(12)

-continued (13)

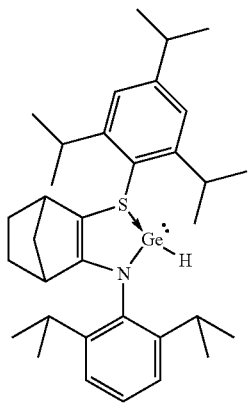

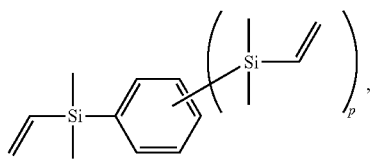

with p being 1 or 2,

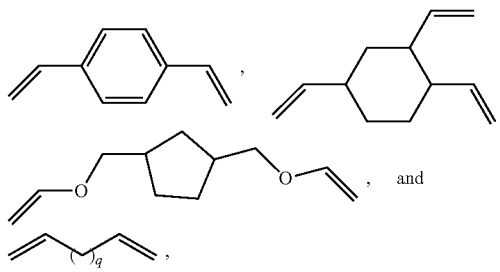

The unsaturated compound (A) used in the hydrosilylation process according to the invention is a chemical compound comprising at least one unsaturation not forming part of an aromatic ring. The unsaturated compound (A) comprises at least one ketone function, aldehyde function, alkene function and/or alkyne function. Any compound comprising at least one ketone, aldehyde, alkene and/or alkyne function may be used in the process according to the invention, insofar as it does not contain a reactive chemical function that might hamper or even prevent the hydrosilylation reaction.

According to one embodiment, the unsaturated compound (A) comprises one or more ketone functions and from 2 to 40 carbon atoms. The unsaturated compound (A) may then preferably be chosen from trifluoroacetophenone, diethyl ketone and acetophenone.

According to another embodiment, the unsaturated compound (A) comprises one or more aldehyde functions and from 2 to 40 carbon atoms. The unsaturated compound (A) may then preferably be chosen from hexanal, 4-fluorobenzaldehyde and benzaldehyde.

According to a particularly preferred embodiment, the unsaturated compound (A) used in the hydrosilylation process according to the invention comprises one or more alkene or alkyne functions and, preferably, from 2 to 40 carbon atoms.

According to another preferred embodiment, the unsaturated compound (A) comprises one or more alkene functions and from 2 to 40 carbon atoms.

According to another preferred embodiment, the unsaturated compound (A) comprises one or more alkyne functions and from 2 to 40 carbon atoms. The unsaturated compound (A) may preferably be chosen from the group formed by acetylene, $C_1$ to $C_4$ alkyl acrylates and methacrylates, acrylic or methacrylic acid, alkenes, preferably octene and more preferentially 1-octene, allyl alcohol, allylamine, allyl glycidyl ether, allyl piperidyl ether, preferentially sterically hindered allyl piperidyl ether, styrenes, preferentially alpha-methylstyrene, 1,2-epoxy-4-vinylcyclohexane, allyl chloride, chloroalkenes, preferably allyl chloride and fluoroalkenes, preferably 4,4,5,5,6,6,7,7-nonafluoro-1-heptene.

The unsaturated compound (A) may be chosen from compounds comprising several alkene functions, preferably two or three alkene functions, and, particularly preferably, compound (A) is chosen from the following compounds:

and with q being from 2 to 6, preferably q being 2 or 4.

According to a preferred embodiment, the unsaturated compound (A) is chosen from organopolysiloxane compounds including units of formula (I):

$$A_g U_h SiO_{(4-(g+h))/2}$$ (I)

in which:
the radicals A, which may be identical or different, represent a linear or branched alkenyl or alkynyl radical containing between 2 and 6 carbon atoms;
the radicals U, which may be identical or different, represent a monovalent radical other than a hydrogen atom, and preferably chosen from the group formed by methyl, ethyl, propyl, 3,3,3-trifluoropropyl, xylyl, tolyl and phenyl;
g and h represent integers, g being 1 or 2, h being 0, 1 or 2 and (g+h) being 1, 2 or 3; and optionally comprising other units of formula (II):

$$U_i SiO_{(4-i)/2}$$ (II)

in which U has the same meaning as above, and i represents an integer from 0 to 3.

In formula (I) and in formula (II), U may represent a monovalent radical chosen from the group formed by an alkyl group containing 1 to 8 carbon atoms, optionally substituted with at least one halogen atom, and an aryl group. U may advantageously represent a monovalent radical chosen from the group formed by methyl, ethyl, propyl, 3,3,3-trifluoropropyl, xylyl, tolyl and phenyl.

Examples of organopolysiloxanes that may be unsaturated compounds (A) according to the invention are:
a poly(dimethylsiloxane) bearing dimethylvinylsilyl end groups;
a poly(dimethylsiloxane-co-methylphenylsiloxane) bearing dimethylvinylsilyl end groups;
a poly(dimethylsiloxane-co-methylvinylsiloxane) bearing dimethylvinylsilyl end groups; and
a poly(dimethylsiloxane-co-methylvinylsiloxane) bearing trimethylsilyl end groups; and
a cyclic poly(methylvinylsiloxane).

As other examples of unsaturated compounds (A), mention may be made of silicone resins which include at least one vinyl radical. For example, they may be chosen from the group formed by the following silicone resins:

MD$^{Vi}$Q wherein the vinyl groups are included in the units D,

MD$^{Vi}$TQ wherein the vinyl groups are included in the units D,

MM$^{Vi}$Q wherein the vinyl groups are included in some of the units M,

MM$^{Vi}$TQ wherein the vinyl groups are included in some of the units M,

MM$^{Vi}$DD$^{Vi}$Q wherein the vinyl groups are included in some of the units M and D, and mixtures thereof, with:

M$^{Vi}$=siloxyl unit of formula (R)$_2$(vinyl)SiO$_{1/2}$
D$^{Vi}$=siloxyl unit of formula (R)vinyl)SiO$_{2/2}$
T=siloxyl unit of formula (R)SiO$_{3/2}$
Q=siloxyl unit of formula SiO$_{4/2}$
M=siloxyl unit of formula (R)$_3$SiO$_{1/2}$
D=siloxyl unit of formula (R)$_2$SiO$_{2/2}$ and the groups R, which may be identical or different, are monovalent hydrocarbon-based groups chosen from alkyl groups having from 1 to 8 carbon atoms inclusive, such as methyl, ethyl, propyl and 3,3,3-trifluoropropyl groups, and aryl groups such as xylyl, tolyl and phenyl groups. Preferably, the groups R are methyls.

The hydrosilylation process according to the invention also uses a compound (B) comprising at least one hydrogenosilyl function. According to one embodiment, compound (B) comprising at least one hydrogenosilyl function is a silane or polysilane compound comprising at least one hydrogen atom bonded to a silicon atom.

In the present invention, the term "silane" compound means chemical compounds comprising a silicon atom bonded to four hydrogen atoms or to organic substituents. In the present invention, the term "polysilane" compound means chemical compounds bearing at least one —Si—Si— unit.

According to a particularly preferred embodiment, compound (B) is phenylsilane.

Compound (B) may also be an organopolysiloxane compound comprising at least one hydrogen atom bonded to a silicon atom. In the present invention, the term "organopolysiloxane" compound means chemical compounds bearing at least one ≡Si—O—Si≡ unit. The organopolysiloxane compound comprises at least two silicon atoms, preferably at least three or more silicon atoms.

Said compound (B) may advantageously be an organopolysiloxane comprising at least one unit of formula (III):

in which:

the radicals U, which may be identical or different, represent a monovalent radical other than a hydrogen atom, and preferably chosen from the group formed by methyl, ethyl, propyl, 3,3,3-trifluoropropyl, xylyl, tolyl and phenyl;

d and e represent integers, d being 1 or 2, e being 0, 1 or 2 and (d+e) being 1, 2 or 3; and optionally other units of formula (IV):

in which U has the same meaning as above, and f represents an integer between 0 and 3.

It is understood in formula (III) and in formula (IV) above that, if several groups U are present, they may be identical to or different from each other. In formula (III), the symbol d may preferentially be equal to 1. Furthermore, in formula (III) and in formula (IV), U may represent a monovalent radical chosen from the group formed by an alkyl group containing 1 to 8 carbon atoms, optionally substituted with at least one halogen atom, and an aryl group. U may advantageously represent a monovalent radical chosen from the group formed by methyl, ethyl, propyl, 3,3,3-trifluoropropyl, xylyl, tolyl and phenyl. Examples of units of formula (III) are the following: H(CH$_3$)$_2$SiO$_{1/2}$, HCH$_3$SiO$_{2/2}$ and H(C$_6$H$_5$)SiO$_{2/2}$.

The organopolysiloxane may have a linear, branched, cyclic or network structure. Examples of organopolysiloxanes that may be organopolysiloxane compounds comprising at least one hydrogen atom bonded to a silicon atom are:

a poly(dimethylsiloxane) bearing hydrogenodimethylsilyl end groups;

a poly(dimethylsiloxane-co-methylhydrogenosiloxane) bearing trimethylsilyl end groups;

a poly(dimethylsiloxane-co-methylhydrogenosiloxane) bearing hydrogenodimethylsilyl end groups;

a poly(methylhydrogenosiloxane) bearing trimethylsilyl end groups; and a cyclic poly(methylhydrogenosiloxane).

Preferably, compound (B) is an organopolysiloxane compound comprising, per molecule, at least two hydrogenosilyl functions (Si—H).

According to a preferred embodiment, the process according to the invention is characterized in that:

a) the unsaturated compound (A) is chosen from organopolysiloxane compounds comprising units of formula (I):

in which:

the radicals A, which may be identical or different, represent a linear or branched alkenyl or alkynyl radical containing between 2 and 6 carbon atoms;

the radicals U, which may be identical or different, represent a monovalent radical other than a hydrogen atom, and preferably chosen from the group formed by methyl, ethyl, propyl, 3,3,3-trifluoropropyl, xylyl, tolyl and phenyl;

g and h represent integers, g being 1 or 2, h being 0, 1 or 2 and (g+h) being 1, 2 or 3; and optionally including other units of formula (II):

in which U has the same meaning as above, and i represents an integer from 0 to 3, and b) compound (B) is an organopolysiloxane comprising at least one unit of formula (III):

in which:

the radicals U, which may be identical or different, represent a monovalent radical other than a hydrogen atom, and preferably chosen from the group formed by methyl, ethyl, propyl, 3,3,3-trifluoropropyl, xylyl, tolyl and phenyl;

d and e represent integers, d being 1 or 2, e being 0, 1 or 2 and (d+e) being 1, 2 or 3;

and optionally other units of formula (IV):

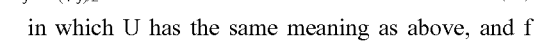

in which U has the same meaning as above, and f represents an integer between 0 and 3.

Finally, compound (B) may be an organic polymer comprising hydrogenosilyl functions in end positions. The organic polymer may be, for example, a polyoxyalkylene, a saturated hydrocarbon-based polymer or a poly(meth)acrylate. Organic polymers comprising reactive functions in end positions are described especially in patent applications US 2009/0182099 and US 2009/0182091.

According to a preferred embodiment, compound (B) comprising at least one hydrogenosilyl function is chosen from the group formed by:
- a silane or polysilane compound comprising at least one hydrogen atom bonded to a silicon atom,
- an organopolysiloxane compound comprising at least one hydrogen atom bonded to a silicon atom, preferably an organopolysiloxane compound comprising, per molecule, at least two hydrogenosilyl functions, and
- an organic polymer comprising hydrogenosilyl functions in end positions.

According to a particular embodiment of the present invention, it is possible for the unsaturated compound (A) and compound (B) comprising at least one hydrogenosilyl function to be the same compound, on the one hand comprising at least one ketone function, aldehyde function, alkene function and/or alkyne function, and on the other hand comprising at least one silicon atom and at least one hydrogen atom bonded to the silicon atom. This compound may then be termed "difunctional", and it is capable of reacting with itself via a hydrosilylation reaction. The invention may thus also relate to a process for the hydrosilylation of a difunctional compound with itself, said difunctional compound on the one hand comprising at least one ketone function, aldehyde function, alkene function and/or alkyne function—preferably at least one alkene function and/or at least one alkyne function—, and on the other hand comprising at least one silicon atom and at least one hydrogen atom bonded to the silicon atom, said process being characterized in that it is catalyzed with an organic compound (C) as described above.

Examples of organopolysiloxanes that may be difunctional compounds are:
- a poly(dimethylsiloxane-co-hydrogenomethylsiloxane-co-vinylmethylsiloxane) bearing dimethylvinylsilyl end groups;
- a poly(dimethylsiloxane-co-hydrogenomethylsiloxane-co-vinylmethylsiloxane) bearing dimethylhydrogenosilyl end groups; and
- a poly(dimethylsiloxane-co-hydrogenomethylsiloxane-co-propyl glycidyl ether-methylsiloxane) bearing trimethylsilyl end groups.

When it is a matter of using the unsaturated compound (A) and compound (B) comprising at least one hydrogenosilyl function, a person skilled in the art understands that this also means the use of a difunctional compound.

The hydrosilylation reaction may be performed in a solvent or in the absence of solvent. As a variant, one of the reagents, for example the unsaturated compound (A), may act as solvent.

Suitable solvents are solvents that are miscible with compound (B).

The hydrosilylation reaction may be performed at a temperature of between 15° C. and 300° C., preferentially between 20° C. and 240° C., more preferentially between 50° C. and 200° C., more preferably between 50° C. and 140° C., and even more preferentially between 50° C. and 100° C.

Organic Compound (C)

A subject of the invention is also an organic compound (C) represented by Formula 1 described previously, including all the embodiments of said organic compound described previously.

In particular, a subject of the invention relates to the organic compound (C) represented by formula (1):

in which:
the symbols "Ge", "N" and "H" represent, respectively, a germanium atom, a nitrogen atom and a hydrogen atom,
the symbol Y is an alkyl group containing from 1 to 12 carbon atoms or an aryl group containing from 6 to 18 carbon atoms, and preferably, Y is an aryl group containing from 6 to 18 atoms,
the groups $R^1$ and $R^2$, which may be identical or different, represent a hydrogen atom, an alkyl group containing from 1 to 20 carbon atoms, an alkenyl group containing from 2 to 12 carbon atoms, an aryl group containing from 6 to 18 carbon atoms, $R^1$ and $R^2$ possibly being connected via a covalent bond so as to form a ring or a bicycle, which is optionally substituted, containing from 5 to 8 atoms, and preferably $R^1$ and $R^2$ are connected via a covalent bond so as to form a ring or a bicycle, which is optionally substituted, containing from 5 to 8 carbon atoms,
the symbol "↗" represents a covalent coordination bond due to the presence in the ligand D of a lone pair of electrons, and
D is a ligand which is a donor group including a lone pair of electrons, and preferably D is a ligand which is a phosphine, sulfide or iminophosphorane group including a lone pair of electrons.

According to a preferred embodiment, the ligand D is chosen from the group formed by:
a phosphine group of formula (2) below:

in which:
the groups $R^3$ and $R^4$, which may be identical or different, represent a hydrogen atom, a halogen atom, a haloalkyl group containing from 1 to 20 carbon atoms, an alkyl group containing from 1 to 20 carbon atoms and optionally one or more nitrogen or silicon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms, and when $R^3$ and $R^4$ are alkyl groups containing from 1 to 20 carbon atoms and optionally one or more nitrogen and/or silicon atoms, said groups $R^3$ and $R^4$ may be linked via a covalent bond so as to form, with the phosphorus atom, a ring of 4, 5 or 6 atoms optionally substituted with one or more alkyl groups containing from 1 to 10 carbon atoms;

a sulfide group of formula (3) below:

(3)

in which:
the group $R^5$ represents a hydrogen atom, a halogen atom, an alkyl or haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; $R^5$ also possibly forming, with the atoms to which it is attached, a monocyclic or polycyclic ring consisting of 3 to 20 atoms; and an iminophosphorane group of formula (4) below:

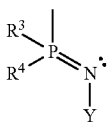
(4)

in which:
the symbol Y represents an alkyl group containing from 1 to 30 carbon atoms or an aryl group containing from 6 to 18 carbon atoms,
the groups $R^3$ and $R^4$, which may be identical or different, represent a hydrogen atom, a halogen atom, an alkyl or a haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; with $R^3$ and $R^4$ also possibly forming, either together or with the atoms to which they are attached, a monocyclic or polycyclic ring consisting of 3 to 20 atoms and possibly containing one or more nitrogen or silicon atoms.

Preferably, the ligand D is a phosphine group of formula (5) or (6) below:

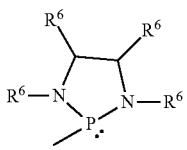
(5)

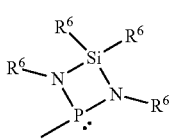
(6)

in which the groups $R^6$ are identical or different and represent an alkyl group containing from 1 to 10 carbon atoms.

The invention also relates to the organic compounds (C) of formulae (7), (8), (9), (10), (11), 12) and (13):

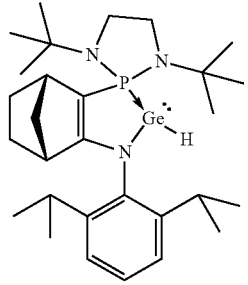
(7)

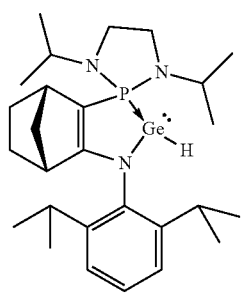
(8)

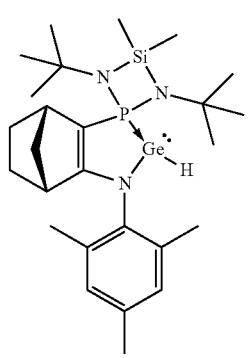
(9)

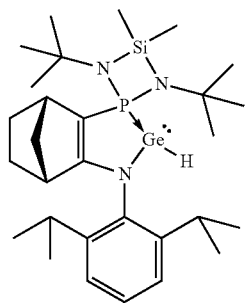
(10)

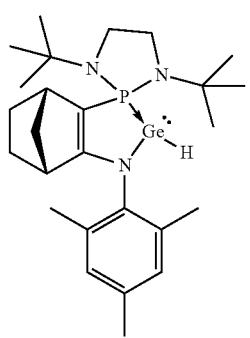
(11)

-continued

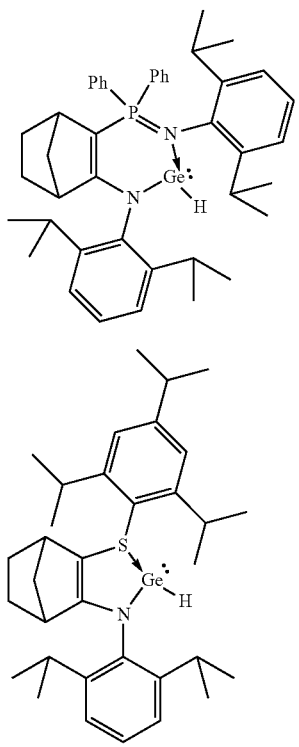

(12)

(13)

Use

A subject of the present invention is also the use of said organic compound (C) according to the invention and described above as a hydrosilylation catalyst.

Composition

A subject of the present invention is also a composition comprising:
- at least one unsaturated compound (A) as described above and in particular comprising at least one ketone function, aldehyde function, alkene function and/or alkyne function,
- at least one compound (B) as described above and in particular comprising at least one hydrogenosilyl function, and
- a catalyst chosen from the organic compounds (C) according to the invention and as described above.

This composition forms the reaction medium in which the hydrosilylation reaction according to the invention may take place. To do this, this composition may be heated as described above.

The relative amount of compound (A) and of compound (B) may be controlled so as to ensure a rate of reaction of the unsaturations with hydrogenosilyl functions. The mole ratio of the Si—H functions of compounds (B) to the alkene and alkyne functions of compounds (A) is between 1:100 and 100:1, preferably between 1:20 and 20:1 and more preferably between 1:5 and 5:1.

According to one embodiment, the mole ratio of the Si—H functions of compounds (B) to the alkene and alkyne functions of compounds (A) is strictly less than 1. The Si—H functions are, here, in deficit relative to the unsaturated functions. According to another embodiment, the mole ratio of the Si—H functions of compounds (B) to the alkene and alkyne functions of compounds (A) is strictly greater than 1. The Si—H functions are then in excess relative to the unsaturated functions.

According to the invention, the molar concentration of catalyst in the composition is from 0.01% to 10%, preferably from 0.1% to 7.5% and more preferably from 0.5% to 5.5% relative to the number of moles of unsaturated compound (A).

Specifically, during the hydrosilylation reaction, the unsaturated compound (A) is usually in deficit, and the molar concentration of catalyst is expressed relative to the number of moles of compound (A) in deficit. In the hypothesis in which, during the hydrosilylation reaction, compound (B) comprising at least one hydrogenosilyl function is in deficit, the molar concentration of catalyst in the composition would be from 0.5% to 10%, preferably from 1% to 7.5% and more preferably from 1.5% to 5.5% relative to the number of moles of compound (B) in deficit. Besides the unsaturated compound (A) and compound (B) comprising at least one hydrogenosilyl function, the composition of the invention may optionally comprise additives.

According to one embodiment of the invention, the additive may be an inhibitor or retarder for the hydrosilylation reaction. These compounds are known to those skilled in the art.

The compositions of the invention may also comprise common functional additives. Families of common functional additives that may be mentioned include:
- fillers;
- adhesion promoters;
- adhesion modifiers;
- heat-resistant additives;
- consistency-enhancing additives;
- pigments; and
- heat-resistant, oil-resistant or fire-resistant additives, for example metal oxides.

The fillers optionally envisaged are preferably mineral. They may especially be siliceous. When they are siliceous materials, they may act as reinforcing or semi-reinforcing filler. The reinforcing siliceous fillers are chosen from colloidal silicas, powders of fumed silica and of precipitated silica, or mixtures thereof. These powders have a mean particle size generally less than 0.1 µm (micrometers) and a BET specific surface area of greater than 30 m²/g, preferably between 30 and 350 m²/g. Semi-reinforcing siliceous fillers such as diatomaceous earths or ground quartz may also be used. As regards the nonsiliceous mineral materials, they may be included as semi-reinforcing or bulking mineral filler. Examples of these nonsiliceous fillers that may be used, alone or as a mixture, are carbon black, titanium dioxide, aluminum oxide, hydrated alumina, expanded vermiculite, non-expanded vermiculite, calcium carbonate optionally surface-treated with fatty acids, zinc oxide, mica, talc, iron oxide, barium sulfate and slaked lime. These fillers have a particle size generally between 0.001 and 300 µm (micrometers) and a BET surface area of less than 100 m²/g. In practical but nonlimiting terms, the fillers used may be a mixture of quartz and silica. The fillers may be treated with any suitable product. In terms of weight, use is preferably made of an amount of filler of between 1% and 50% by weight and preferably between 1% and 40% by weight relative to all the constituents of the composition.

More generally, in quantitative terms, the compositions according to the invention may have standard proportions in the technical field under consideration, given that the intended application must also be taken into account.

Other aims, characteristics and advantages of the invention will emerge from the examples that follow, which are given as purely nonlimiting illustrations.

EXAMPLES

Organic compounds (7), (8), (9), (10) and (11) according to the invention:

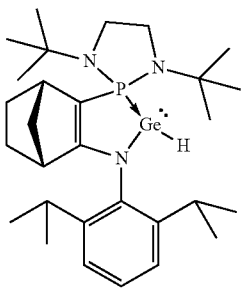

(7)

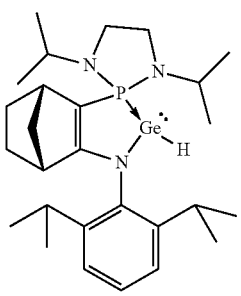

(8)

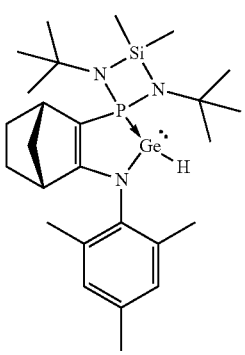

(9)

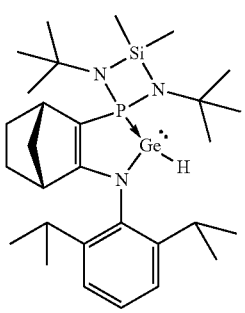

(10)

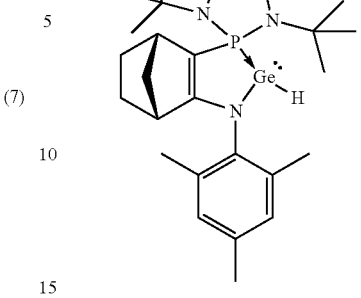

(11)

Comparative organic compound $D_H$:

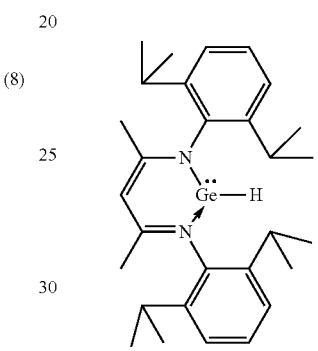

$D_H$

All the manipulations were performed under an argon atmosphere using Schlenk techniques and a glovebox. The solvents were dried and degassed. The various NMR spectra ($^1$H, $^{13}$C, $^{19}$F, $^{29}$Si and $^{31}$P) were recorded on a Brüker Avance 300 MHz spectrometer. The chemical shifts of the $^1$H, $^{29}$Si and $^{13}$C NMR spectra are given in ppm relative to $(CH_3)_4Si$ as internal standard. The chemical shifts of the $^{31}$P spectra are given in ppm relative to $H_3PO_4$ (85%). The GC-MS analyses were performed on a Perkin-Elmer Clarus 500 chromatograph equipped with an FID, an MS detector and an SGE BPX5 column.

Example 1: Preparation of the Organic Compound (7) According to the Invention

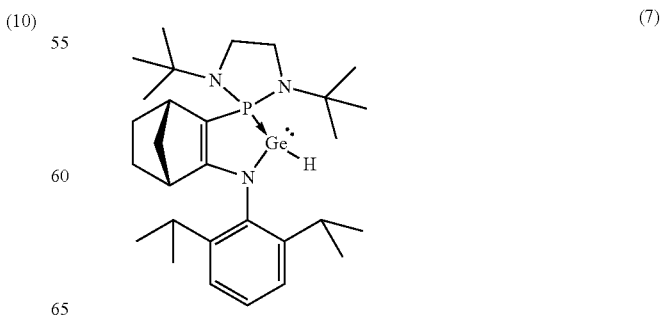

(7)

1-a) Reaction Scheme:

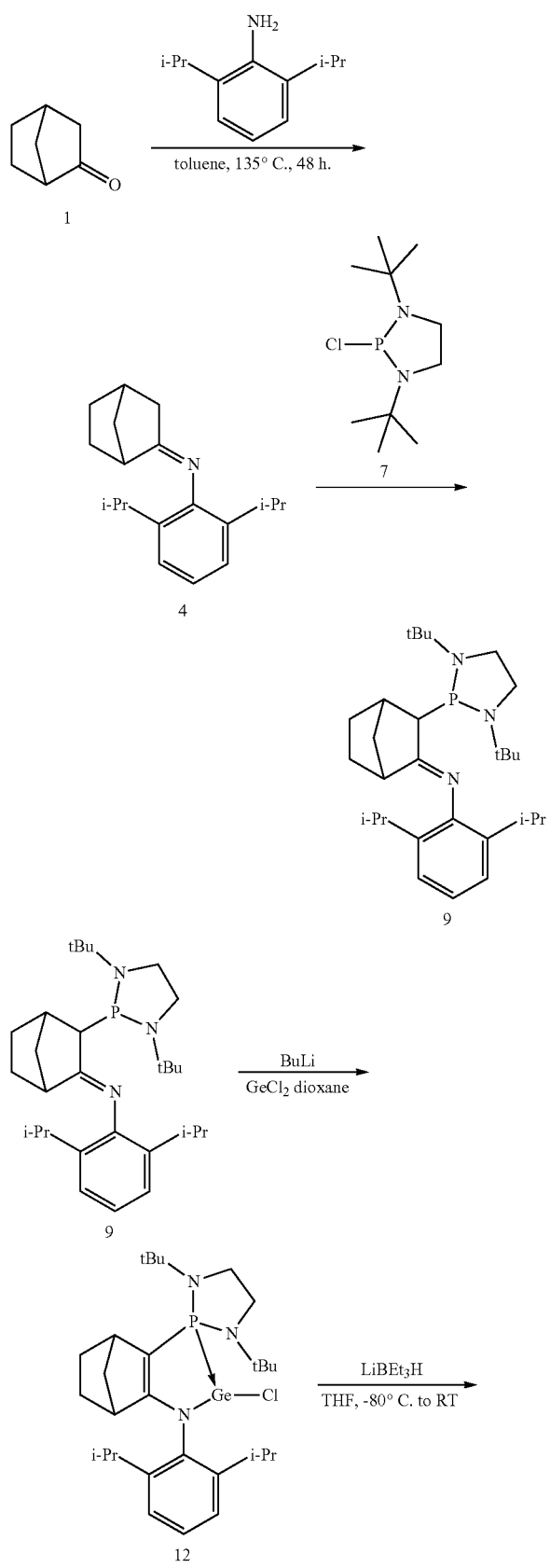

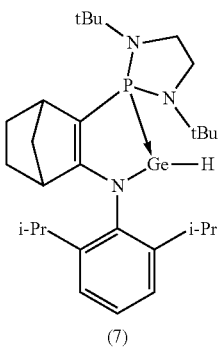

1-b) Synthesis of the Intermediate Compound 4:

Norcamphor 1 (30 g, 0.3 mol), diisopropylaniline (57 mL, 0.3 mol), a catalytic amount of para-toluenesulfonic acid (0.58 g, 3 mmol) and toluene (150 mL) are placed in a 500 mL two-necked round-bottomed flask equipped with a condenser and Dean-Stark apparatus. The mixture is refluxed for 3 days at 135° C. The solvent is evaporated off and the oily residue is taken up in acetone and filtered to remove the small amount of solid formed. The solution is then crystallized by slow evaporation of the pentane at room temperature. Product 4 is obtained in the form of transparent crystals after 2 days (60 g, 74%).

$^1$H NMR (300 MHz, $C_6D_6$, ppm) δ=1.09 (d, $J_{HH}$=6.8 Hz, 3H, $CH_{3i-Pr}$), 1.10 (d, $J_{HH}$=6.7 Hz, 3H, $CH_{3i-Pr}$), 1.12 (d, $J_{HH}$=6.3 Hz, 3H, $CH_{3i-Pr}$), 1.13 (d, $J_{HH}$=6.9 Hz, 3H, $CH_{3i-Pr}$), 1.21-1.89 (m, 8H, $CH_2$), 2.44 (m, 1H, $CH_{tdp}$), 2.75 (sept, $J_{HH}$=6.8 Hz, 1H, $CH_{i-Pr}$), 2.82 (sept, $J_{HH}$=6.8 Hz, 1H, $CH_{i-Pr}$), 2.98 (m, 1H, $CH_{tdp}$), 7.03 (m, 3H, $CH_{ar}$); $^{13}C\{^1H\}$ (75 MHz, $C_6D_6$, ppm) δ=22.7 (s, $CH_{3i-Pr}$), 22.9 (s, $CH_{3i-Pr}$), 23.4 (s, $CH_{3i-Pr}$), 23.6 (s, $CH_{3i-Pr}$), 26.5 (s, $CH_2$), 27.6 (s, $CH_2$), 27.7 (s, $CH_{i-Pr}$), 28.0 (s, $CH_{i-Pr}$), 35.9 (s, $CH_{tdp}$), 38.2 (s, $CH_2$), 38.8 (s, $CH_2$), 47.0 (s, $CH_{tdp}$), 123.0 (s, $CH_{ar}$), 123.1 (s, $CH_{ar}$), 123.4 (s, $CH_{ar}$), 135.8 (s, $C_{ar}$), 136.2 (s, $C_{ar}$), 147.0 (s, $C_{ar}$), 179.9 (s, C=N).

1-c) Synthesis of the Intermediate Compound 7:

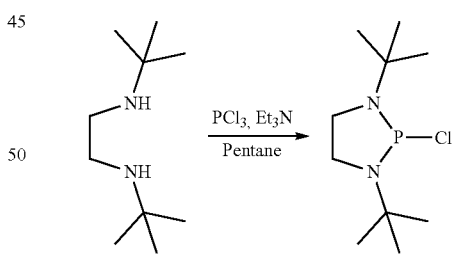

A solution of diamine 3 (5.93 g, 34 mmol) and of triethylamine (9.62 mL, 70 mmol) in 10 mL of toluene is added to a solution of $PCl_3$ (3 mL, 34 mmol) in toluene (20 mL) cooled to 0° C. The mixture is then stirred over the weekend at room temperature. After filtration and extraction with pentane (2×20 mL), the filtrates are combined and dried to give product 7 in the form of a white powder (6.5 g, 81%).

$^1$H-NMR (300 MHz, $C_6D_6$, 25° C.) δ=1.24 (d, $J_{HH}$=2.11 Hz, 12H, $CH_3$), 2.84 (d, $J_{PH}$=6.65 Hz, 2H, $CH_2$), 3.08 (s, 2H, $CH_2$); $^{31}P\{^1H\}$-NMR (75 MHz, $C_6D_6$, 25° C.) δ=168.22.

1-d) Synthesis of the Intermediate Compound 9:

nBuLi (1.6 M, 20 mL, 31 mmol) is added dropwise with vigorous stirring to a solution of imine 4 (8.08 g, 30 mmol) in 35 mL of THF cooled to −78° C. The lithiated mixture is then stirred for 1 hour at room temperature, followed by cooling again to −78° C. The chlorophosphine 7 (5.38 g, 30 mmol) is then added dropwise, and the mixture is then stirred at room temperature. Once the solvent has been evaporated off, the solid is extracted with pentane (50 mL) and with ether (50 mL) and dried. The product is then washed with acetonitrile (3×30 mL) and dried again to give product 9 in the form of a white powder (20.2 g, 76%).

$^1$H-NMR (300 MHz, C$_6$D$_6$, 25° C.) δ=1.05 (m, 1H, CH$_2$), 1.17 (s, 9H, CH$_{3tBu}$), 1.22 (m, 3H, CH$_2$), 1.25 (d, J$_{HH}$=6.8 Hz, 3H, CH$_{3iPr}$), 1.28 (d, J$_{HH}$=6.8 Hz, 6H, CH$_{3iPr}$), 1.32 (d, J$_{HH}$=6.8 Hz, 3H, CH$_{3iPr}$), 1.38 (s, 9H, CH$_{3tBu}$), 1.54 (m, 1H, CH$_2$), 1.8 (d, J$_{HH}$=9.8 Hz, 1H, PCH), 2.34 (d, J$_{PH}$=3.5 Hz, 1H, CH$_{bridgehead}$), 2.61 (d, J$_{PH}$=3 Hz, 1H, CH$_{bridgehead}$), 2.75 (m, 2H, NCH$_2$), 2.87 (m, 1H, CH$_2$), 2.9 (m, 1H, CH$_2$), 3.0 (m, 1H, CH$_2$), 3.05 (sept., J$_{HH}$=6.8 Hz, 1H, CH$_{iPr}$), 3.46 (sept, J$_{HH}$=6.8 Hz, 1H, CH$_{iPr}$), 7.07-7.23 (m, 3H, CH$_{Ar}$); $^{31}$P{$^1$H}-NMR (121 MHz, C$_6$D$_6$, 25° C.) δ=90.45.

1-e) Synthesis of the Intermediate Compound 12:

nBuLi (1.6 M, 1.82 mL, 2.9 mmol) is added dropwise with vigorous stirring to a solution of iminophosphine 9 (1.36 g, 2.89 mmol) in 14 mL of THF cooled to −78° C. The lithiated mixture is then stirred for 1 hour at room temperature, followed by cooling again to −78° C. A solution of dichlorogermylene dioxane (0.68 g, 3 mmol) in THF (8 mL) is then added dropwise, and the mixture is then stirred at room temperature. Once the solvent has been evaporated off, the solid is extracted with pentane (30 mL) and with ether (30 mL) and the mixture is then concentrated. Product 12 is obtained in the form of yellow crystals (1.16 g, 70%, mixture of two isomers) after crystallization at −30° C.

Major Isomer 12 (60%)

$^1$H-NMR (499.9 MHz, C$_6$D$_6$, 25° C.) δ=1.13 (m, 1H, CH$_{2bridge}$), 1.18 (s, 9H, CH$_{3tBu}$), 1.22 (d, J$_{HH}$=6.8 Hz, 3H, CH$_{3iPr}$), 1.25 (d, J$_{HH}$=6.8 Hz, 3H, CH$_{3iPr}$), 1.26 (m, 2H, CH$_2$), 1.37 (d, J$_{HH}$=6.8 Hz, 3H, CH$_{3iPr}$), 1.44 (9, 9H, CH$_{3tBu}$), 1.55 (m, 2H, CH$_2$), 1.58 (d, J$_{HH}$=6.8 Hz, 3H, CH$_{3iPr}$), 1.68 (m, 1H, CH$_{2bridge}$), 2.5 (m, 1H, CH$_{bridgehead}$), 2.6 (m, 2H, CH$_2$), 2.7 (m, 2H, CH$_2$), 2.96 (m, 1H, CH$_{bridgehead}$), 3.47 (sept, J$_{HH}$=6.8 Hz, 1H, CH$_{iPr}$), 3.65 (sept., J$_{HH}$=6.8 Hz, 1H, CH$_{iPr}$), 7.1-7.26 (m, 3H, CH$_{Ar}$); $^{13}$C{$^1$H}-NMR (125.7 MHz, C$_6$D$_6$, 25° C.) δ=24.7 (s, CH$_{3iPr}$), 24.9 (s, CH$_{3iPr}$), 25 (d, J$_{PC}$=1.6 Hz, CH$_2$), 25.9 (s, CH$_{3iPr}$), 26.3 (s, CH$_{3iPr}$), 27.84 (s, CH$_{iPr}$), 28.45 (s, CH$_{iPr}$), 29.2 (d, J$_{PC}$=0.9 Hz, CH$_2$), 29.9 (d, J$_{PC}$=1.1 Hz, CH$_{3tBu}$), 30 (d, J$_{PC}$=3 Hz, CH$_{3tBu}$), 41.4 (d, J$_{PC}$=7.9 Hz, CH$_{bridgehead}$), 43.1 (s, CH$_2$), 43.2 (s, CH$_2$), 44.1 (d, J$_{PC}$=14.5 Hz, CH$_{bridgehead}$), 46.9 (d, J$_{PC}$=4.1 Hz, CH$_2$), 53.26 (d, J$_{PC}$=7.2 Hz, C$_{tBu}$), 54.1 (d, J$_{PC}$=7.8 Hz, C$_{tBu}$), 94.7 (d, J$_{PC}$=26.4 Hz, PC), 124.1 (s, CH$_{Ar}$), 124.5 (s, CH$_{Ar}$), 126.9 (s, CH$_{Ar}$), 139.8 (d, J$_{PC}$=3.8 Hz, NC$_{Ar}$), 145.8 (s, C$_{Ar}$), 147.7 (s, C$_{Ar}$), 184.6 (d, J$_{PC}$=43.4 Hz, NC).

$^{31}$P{$^1$H}-NMR (202.3 MHz, C$_6$D$_6$, 25° C.) δ=71.8 (s).

Minor Isomer 12' (40%)

$^1$H-NMR (499.9 MHz, C$_6$D$_6$, 25° C.) δ=1.11 (m, 1H, CH$_{2bridge}$), 1.13 (m, 2H, CH$_2$), 1.2 (d, J$_{HH}$=6.8 Hz, 3H, CH$_{3iPr}$), 1.23 (s, 9H, CH$_{3tBu}$), 1.27 (d, J$_{HH}$=6.8 Hz, 3H, CH$_{3iPr}$), 1.31 (d, J$_{HH}$=6.8 Hz, 3H, CH$_{3iPr}$), 1.4 (m, 2H, CH$_2$), 1.45 (9, 9H, CH$_{3tBu}$), 1.6 (d, J$_{HH}$=6.8 Hz, 3H, CH$_{3iPr}$), 1.65 (m, 1H, CH$_{2bridge}$), 2.5 (m, 1H, CH$_{bridgehead}$), 2.6 (m, 2H, CH$_2$), 2.7 (m, 2H, CH$_2$), 2.96 (m, 1H, CH$_{bridgehead}$), 3.18 (sept., J$_{HH}$=6.8 Hz, 1H, CH$_{iPr}$), 3.99 (sept., J$_{HH}$=6.8 Hz, 1H, CH$_{iPr}$), 7.1-7.26 (m, 3H, CH$_{Ar}$); $^{13}$C{$^1$H}-NMR (125.7 MHz, C$_6$D$_6$, 25° C.) δ=24.1 (s, CH$_{3iPr}$), 25.4 (s, CH$_{3iPr}$), 25.4 (d, J$_{PC}$=1.6 Hz, CH$_2$), 25.8 (s, CH$_{3iPr}$), 26.6 (s, CH$_{3iPr}$), 27.7 (s, CH$_{iPr}$), 28.5 (s, CH$_{iPr}$), 28.7 (d, J$_{PC}$=1.2 Hz, CH$_2$), 29.4 (d, J$_{PC}$=3.8 Hz, CH$_{3tBu}$), 30.5 (d, J$_{PC}$=1 Hz, CH$_{3tBu}$), 42.3 (d, J$_{PC}$=7.9 Hz, CH$_{bridgehead}$), 43.5 (d, J$_{PC}$=2.4 Hz, CH$_2$), 43.7 (s, CH$_2$), 44.1 (d, J$_{PC}$=14.5 Hz, CH$_{bridgehead}$), 48.9 (d, J$_{PC}$=5.7 Hz, CH$_2$), 53.5 (d, J$_{PC}$=5 Hz, C$_{tBu}$), 53.8 (d, J$_{PC}$=9 Hz, C$_{tBu}$), 98 (d, J$_{PC}$=22.9 Hz, PC), 124 (s, CH$_{Ar}$), 124.6 (s, CH$_{Ar}$), 127 (s, CH$_{Ar}$), 130.1 (d, J$_{PC}$=6.3 Hz, NC$_{Ar}$), 146.2 (s, C$_{Ar}$), 148.2 (s, C$_{Ar}$), 183.8 (d, J$_{PC}$=40 Hz, NC).

$^{31}$P{$^1$H}-NMR (202.3 MHz, C$_6$D$_6$, 25° C.) δ=74.8 (s).

1-f) Synthesis of the Organic Compound (7)

A solution of LiBEt$_3$H (1.0 M, 1.5 mL, 1.5 mmol) is added to a solution of chlorogermylene 12 (680 mg, 1.18 mmol) in 4 mL of THF cooled to −78° C., and the mixture is stirred at −78° C. for 30 minutes and then at room temperature for 30 minutes. Once the various volatile compounds have been evaporated off, the solid is extracted with pentane (10 mL) and with ether (10 mL) and then dried. The organic compound (7) is obtained in the form of yellow crystals (540 mg, 85%) after crystallization from pentane at −30° C.

Example 2: Preparation of the Organic Compound (8) According to the Invention (8)

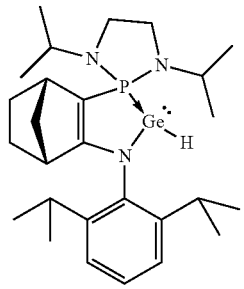

2-a) Reaction Scheme:

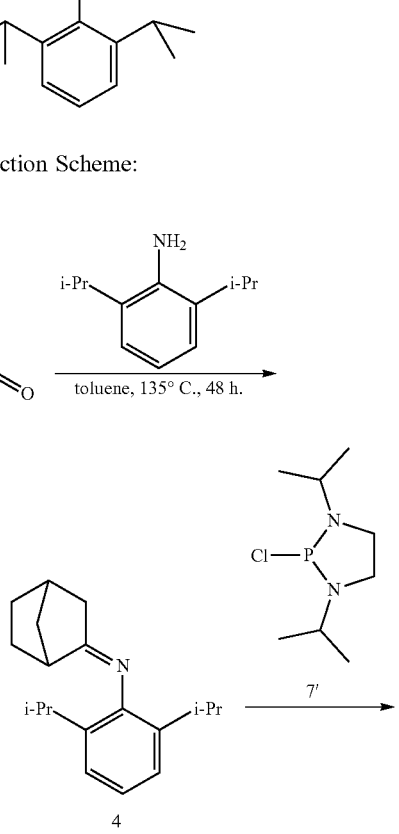

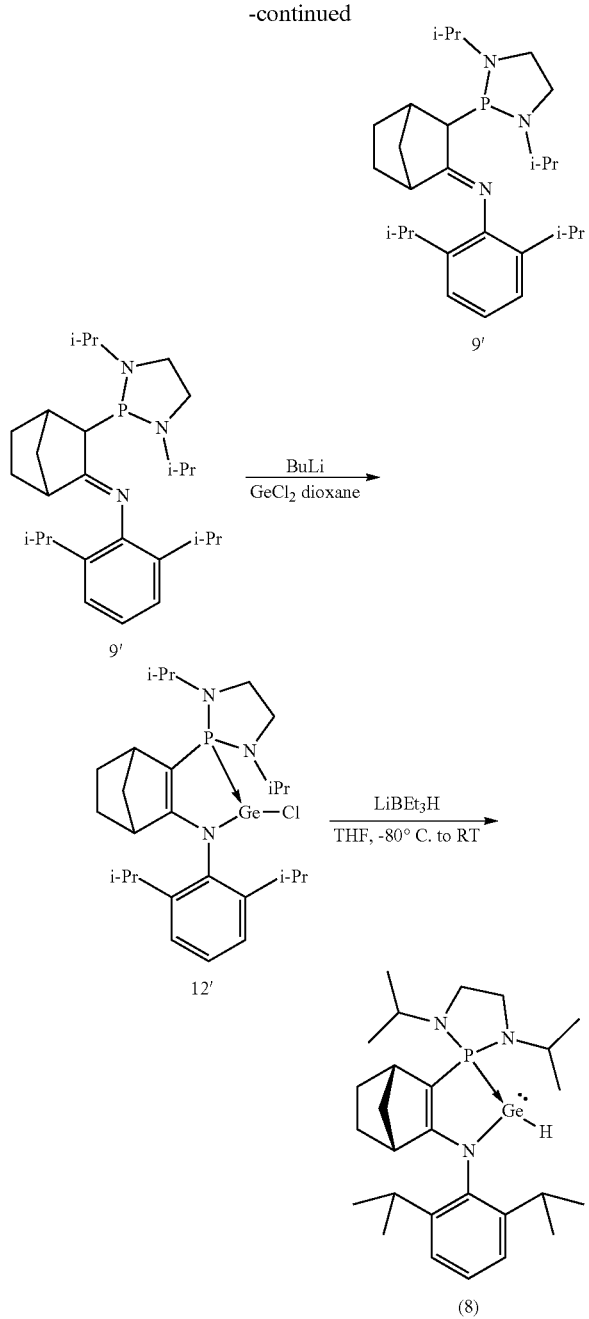

2-b) Synthesis of the Intermediate Compound 7':
See example 1-b)

2-c) Synthesis of the Intermediate Compound 7':

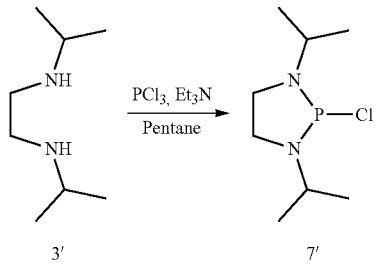

Trichlorophosphine PCl₃ (8.75 mL, 0.10 mol) is added to a solution of diamine 3' (14.4 g, 0.10 mol) and triethylamine (70 mL, 0.50 mol) in 60 mL of THF cooled to 0° C. The mixture is then stirred for 20 hours at room temperature. Product 7' is extracted by filtration and extraction with pentane (100 mL) before being obtained by distillation in the form of a colorless oil (12.3 g, 60%).

$^1$H-NMR (300 MHz, C$_6$D$_6$, 25° C.) δ=0.90 (d, J$_{HH}$=3.4 Hz, 12H, CH$_3$), 2.87 (b, 2H, CH), 2.97 (m, 4H, CH$_2$); $^{13}$C{$^1$H}-NMR (75 MHz, C$_6$D$_6$, 25° C.) δ=21.4 (s, CH$_3$), 22.0 (s, CH$_3$), 46.7 (d, J$_{PC}$=10.4 Hz, CH$_2$), 48.0 (d, J$_{PC}$=14.9 Hz, CH); $^{31}$P{$^1$H}-NMR (75 MHz, C$_6$D$_6$, 25° C.) δ=160.8.

2-d) Synthesis of the Intermediate Compound 9':

nBuLi (1.6 M, 39 mL, 62.5 mmol) is added dropwise with vigorous stirring to a solution of imine 4 (16.03 g, 59.5 mmol) in 70 mL of THF cooled to −78° C. The lithiated mixture is then stirred for 1 hour at room temperature, followed by cooling again to −78° C. The chlorophosphine (12.3 g, 59.5 mmol) is then added dropwise, and the mixture is then stirred at room temperature for 2 hours. Once the solvent has been evaporated off, the solid is washed with acetonitrile (3×80 mL), dried and then dissolved in pentane and filtered. Once the solvent has been evaporated off, the product is obtained in the form of a white powder (20.2 g, 76%).

$^1$H-NMR (300 MHz, C$_6$D$_6$, 25° C.) δ=1.03 (d, J$_{HH}$=2.1 Hz, 3H, CH$_{3i-Pr}$), 1.06 (b, 9H, CH$_{3i-Pr}$), 1.11 (b, 9H, CH$_{3i-Pr}$), 1.15 (d, J$_{HH}$=1.8 Hz, 3H, CH$_{3i-Pr}$), 1.22 (m, 2H, CH$_2$), 1.32 (m, 2H, CH$_2$), 1.68 (m, 2H, CH$_2$), 2.16 (d, J$_{HH}$=3.6 Hz, 1H, PCH), 2.46 (d, J$_{HH}$=9.6 Hz, 1H, CH$_{bridgehead}$), 2.56 (m, 1H, CH$_{bridgehead}$), 2.79 (sept, J$_{HH}$=9.6 Hz, 1H, CH$_{i-Pr}$), 2.91 (m, 1H, CH$_{i-Pr}$), 3.02 (m, 3H, NCH$_2$, CH$_{i-Pr}$), 3.20 (m, 2H, NCH$_2$), 3.41 (m, 1H, CH$_{i-Pr}$), 6.90-7.05 (m, 3H, CH$_{Ar}$); $^{13}$C{$^1$H}-NMR (75 MHz, C$_6$D$_6$, 25° C.) δ=22.0 (d, J$_{PC}$=6.7 Hz, CH$_{3i-Pr}$), 22.2 (d, J$_{PC}$=6.5 Hz, CH$_{3i-Pr}$), 22.2 (s, CH$_{3i-Pr}$), 22.4 (d, J$_{PC}$=7.3 Hz, CH$_{3i-Pr}$), 22.8 (d, J$_{PC}$=13.8 Hz, CH$_{3i-Pr}$), 23.0 (s, CH$_{3i-Pr}$), 24.3 (s, CH$_{i-Pr}$), 24.7 (s, CH$_{i-Pr}$), 25.2 (d, J$_{PC}$=1.5 Hz, CH$_2$), 27.5 (d, J$_{PC}$=3.4 Hz, CH$_{i-Pr}$), 28.3 (s, CH$_{i-Pr}$), 29.2 (d, J$_{PC}$=1.2 Hz, CH$_2$), 35.9 (d, J$_{PC}$=4.2 Hz, CH$_2$), 39.4 (d, J$_{PC}$=4.7 Hz, CH$_{i-Pr}$), 42.2 (s, CH$_{i-Pr}$), 45.6 (d, J$_{PC}$=8.8 Hz, CH$_2$), 48.2 (d, J$_{PC}$=7.2 Hz, CH$_2$), 49.0 (d, J$_{PC}$=20.7 Hz, CH$_{bridgehead}$), 52.2 (d, J$_{PC}$=26.0 Hz, CH$_{bridgehead}$), 55.6 (d, J$_{PC}$=42.1 Hz, PCH), 122.6 (s, CH$_{Ar}$), 123.1 (s, CH$_{Ar}$), 123.2 (s, CH$_{Ar}$), 136.2 (d, J$_{PC}$=1.7 Hz, C$_{Ar}$), 136.8 (d, J$_{PC}$=1.3 Hz, C$_{Ar}$), 147.9 (d, J$_{PC}$=1.4 Hz, C$_{Ar}$), 180.4 (d, J$_{PC}$=8.0 Hz, N═C); $^{31}$P{$^1$H}-NMR (121 MHz, C$_6$D$_6$, 25° C.) δ=104.7.

2-e) Synthesis of the Intermediate Compound 12':

nBuLi (1.6 M, 4.4 mL, 7.1 mmol) is added dropwise with vigorous stirring to a solution of iminophosphine 9' (3.0 g, 6.79 mmol) in 20 mL of THF cooled to −78° C. The lithiated mixture is then stirred for 1 hour at room temperature, followed by cooling again to −78° C. A solution of dichlorogermylene dioxane (1.6 g, 6.8 mmol) in THF (10 mL) is then added dropwise, and the mixture is then stirred at room temperature for 2 hours. Once the solvent has been evaporated off, the solid is extracted with toluene (40 mL) and then dried again. Product 12' is obtained in the form of a yellow powder (mixture of two isomers) after washing with pentane (2×20 mL) and evaporation of the solvent (3.5 g, 94%).

Isomer 1 (45%)

$^1$H-NMR (300 MHz, C$_6$D$_6$, 25° C.) δ=0.91 (d, J$_{HH}$=6.8 Hz, 3H, CH$_{3i-Pr}$), 0.93 (d, J$_{HH}$=6.1 Hz, 3H, CH$_{3i-Pr}$), 1.01 (d, J$_{HH}$=7.0 Hz, 3H, CH$_{3i-Pr}$), 1.19 (d, J$_{HH}$=7.1 Hz, 3H, CH$_{3i-Pr}$), 1.20 (m, 1H, CH$_2$), 1.26 (d, J$_{HH}$=7.4 Hz, 3H, CH$_{3i-Pr}$), 1.27 (d, J$_{HH}$=7.1 Hz, 3H, CH$_{3i-Pr}$), 1.29 (d, J$_{HH}$=5.8 Hz, 3H, CH$_{3i-Pr}$), 1.35 (b, 1H, CH$_2$), 1.50 (b, 2H, CH$_2$), 1.53 (d, J$_{HH}$=6.1 Hz, 3H, CH$_{3i-Pr}$), 1.68 (b, 1H, CH$_2$), 1.73 (b, 1H, CH$_2$), 2.32 (b, 1H, PCCH$_{tdp}$), 2.42-2.70 (m, 4H, NCH₂), 2.73 (b, 1H, NCCH$_{tdp}$), 3.14 (sept, $J_{HH}$=6.9 Hz, 1H, CH$_{i-Pr}$), 3.24 (m, 1H, CH$_{i-Pr}$), 3.70 (sept, $J_{HH}$=6.8 Hz, 1H, CH$_{i-Pr}$), 4.05 (m, 1H, CH$_{i-Pr}$), 7.07-7.22 (m, 3H, CH$_{Ar}$); $^{13}$C{$^1$H}-NMR (75 MHz, C₆D₆, 25° C.) δ=20.3 (d, $J_{PC}$=2.1 Hz, CH$_{3i-Pr}$), 20.7 (s, CH$_{3i-Pr}$), 21.1 (d, $J_{PC}$=5.4 Hz, CH$_{3i-Pr}$), 22.2 (d, $J_{PC}$=4.3 Hz, CH$_{3i-Pr}$), 24.0 (s, CH$_{3i-Pr}$), 24.6 (s, CH$_{3i-Pr}$), 25.5 (s, CH₂), 25.9 (s, CH$_{3i-Pr}$), 26.2 (s, CH$_{i-Pr}$), 27.8 (s, CH$_{i-Pr}$), 28.8 (s, CH$_{i-Pr}$), 29.6 (d, $J_{PC}$=0.8 Hz, CH₂), 38.7 (s, CH₂), 39.3 (d, $J_{PC}$=1.9 Hz, CH₂), 40.5 (d, $J_{PC}$=8.0 Hz, CH$_{tdp}$), 43.4 (d, $J_{PC}$=14.2 Hz, CH$_{tdp}$), 44.4 (d, $J_{PC}$=9.7 Hz, CH$_{i-Pr}$), 45.0 (d, $J_{PC}$=1.75 Hz, CH$_{i-Pr}$), 48.8 (d, $J_{PC}$=3.1 Hz, CH₂), 91.8 (d, $J_{PC}$=21.6 Hz, PC), 123.8 (s, CH$_{Ar}$), 124.5 (s, CH$_{Ar}$), 126.6 (s, CH$_{Ar}$), 140.3 (d, $J_{PC}$=5.7 Hz, C$_{Ar}$), 146.3 (s, C$_{Ar}$), 147.6 (s, C$_{Ar}$), 191.1 (d, $J_{PC}$=42.4 Hz, NC); $^{31}$P{$^1$H}-NMR (121 MHz, C₆D₆, 25° C.) δ=71.3.

Isomer 2 (55%)

$^1$H-NMR (300 MHz, C₆D₆, 25° C.) δ=0.98 (d, $J_{HH}$=6.5 Hz, 3H, CH$_{3i-Pr}$), 1.00 (d, $J_{HH}$=7.1 Hz, 3H, CH$_{3i-Pr}$), 1.04 (d, $J_{HH}$=7.1 Hz, 3H, CH$_{i-Pr}$), 1.18 (m, 1H, CH₂), 1.21 (d, $J_{HH}$=6.8 Hz, 3H, CH$_{3i-Pr}$), 1.24 (d, $J_{HH}$=7.1 Hz, 3H, CH$_{3i-Pr}$), 1.31 (d, $J_{HH}$=6.5 Hz, 3H, CH$_{3i-Pr}$), 1.34 (d, $J_{HH}$=7.1 Hz, 3H, CH$_{3i-Pr}$), 1.38 (b, 1H, CH₂), 1.40 (b, 1H, CH₂), 1.50 (d, $J_{HH}$=6.7 Hz, 3H, CH$_{3i-Pr}$), 1.52 (b, 1H, CH₂), 1.62 (b, 1H, CH₂), 1.68 (b, 1H, CH₂), 2.42-2.70 (m, 4H, CH₂), 2.60 (b, 1H, PCCH$_{tdp}$), 2.88 (b, 1H, NCCH$_{tdp}$), 3.26 (sept, $J_{HH}$=6.7 Hz, 1H, CH$_{i-Pr}$), 3.47 (m, 1H, CH$_{i-Pr}$), 3.99 (sept, $J_{HH}$=6.9 Hz, 1H, CH$_{i-Pr}$), 4.21 (m, 1H, CH$_{i-Pr}$), 7.07-7.22 (m, 3H, CH$_{Ar}$); $^{13}$C{$^1$H}-NMR (75 MHz, C₆D₆, 25° C.) δ=20.4 (d, $J_{PC}$=0.7 Hz, CH$_{3i-Pr}$), 21.0 (d, $J_{PC}$=2.3 Hz, CH$_{3i-Pr}$), 21.3 (d, $J_{PC}$=5.6 Hz, CH$_{3i-Pr}$), 22.0 (d, $J_{PC}$=6.9 Hz, CH$_{3i-Pr}$), 24.2 (s, CH$_{3i-Pr}$), 24.4 (s, CH$_{3i-Pr}$), 25.4 (s, CH$_{3i-Pr}$), 25.5 (s, CH₂), 26.1 (d, $J_{PC}$=2.0 Hz, CH$_{3i-Pr}$), 27.9 (s, CH$_{i-Pr}$), 28.7 (s, CH$_{i-Pr}$), 29.6 (d, $J_{PC}$=1.2 Hz, CH₂), 38.7 (s, CH₂), 39.4 (d, $J_{PC}$=2.8 Hz, CH₂), 40.9 (d, $J_{PC}$=8.5 Hz, CH$_{i-Pr}$), 44.2 (d, $J_{PC}$=13.4 Hz, CH$_{tdp}$), 44.8 (d, $J_{PC}$=3.4 Hz, CH$_{i-Pr}$), 45.2 (d, $J_{PC}$=9.0 Hz, CH$_{i-Pr}$), 46.8 (d, $J_{PC}$=4.7 Hz, CH₂), 89.7 (d, $J_{PC}$=25.2 Hz, PC), 123.3 (s, CH$_{Ar}$), 124.3 (s, CH$_{Ar}$), 126.6 (s, CH$_{Ar}$), 139.5 (d, $J_{PC}$=4.1 Hz, C$_{Ar}$), 145.5 (s, C$_{Ar}$), 147.6 (s, C$_{Ar}$), 190.5 (d, $J_{PC}$=41.1 Hz, NC); $^{31}$P{$^1$H}-NMR (121 MHz, C₆D₆, 25° C.) δ=65.2.

2-f) Synthesis of the Organic Compound (8):

The same protocol as described in example 1-f) is used to prepare the organic compound (8) from the intermediate compound 12'.

Example 3: Preparation of the Organic Compound (9) According to the Invention

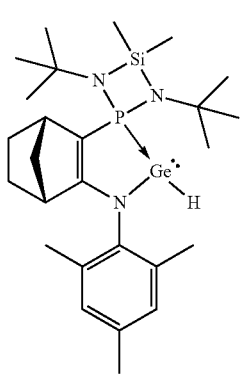

(9)

3-a) Reaction Scheme

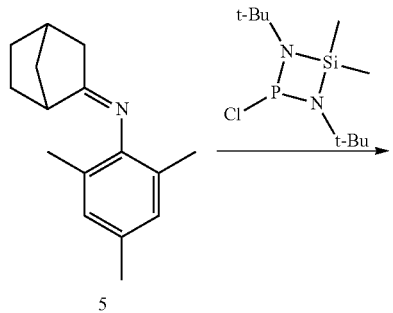

5

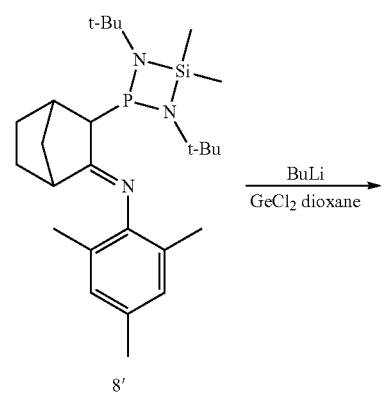

8'

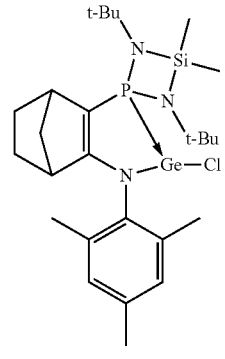

11'

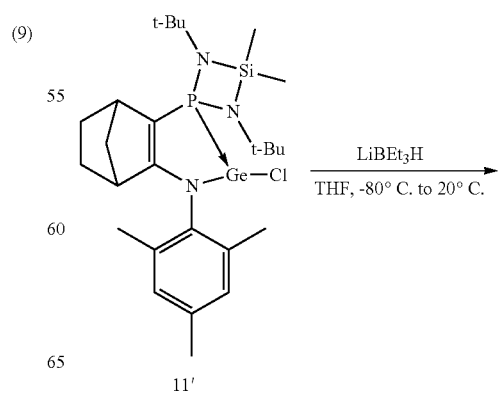

11'

-continued

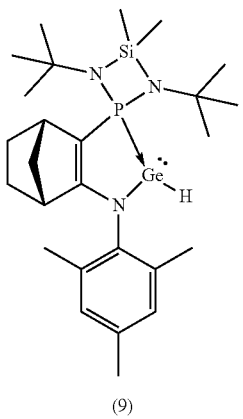

(9)

3-b) Synthesis of the Intermediate Compound 8':

nBuLi (1.6 M, 34 mL, 54 mmol) is added dropwise with vigorous stirring to a solution of mesitylimine 5 (11.7 g, 51.46 mmol, prepared according to example 5-b) described below) in 70 mL of THF cooled to −78° C. The lithiated mixture is then stirred for 1 hour at room temperature, followed by cooling again to −78° C. The chlorophosphine 6 (12.5 g, 46.8 mmol) is then added dropwise, and the mixture is then stirred at room temperature. Once the solvent has been evaporated off, the solid is washed with acetonitrile (3×80 mL) and then taken up in pentane, filtered and dried to give product 8' in the form of a white powder (19.7 g, 92%).

$^1$H-NMR (300 MHz, C$_6$D$_6$, 25° C.) δ=0.37 (s, 3H, CH$_{3Si}$), 0.41 (s, 3H, CH$_{3Si}$), 1.00-1.05 (m, 1H, CH$_2$), 1.21 (s, 9H, CH$_{3t\text{-}Bu}$), 1.28-1.32 (m, 3H, CH$_2$), 1.37 (s, 9H, CH$_{3t\text{-}Bu}$), 1.60 (m, 1H, CH$_2$), 1.72-1.75 (m, 1H, CH$_2$), 2.21 (s, 9H, CH$_3$), 2.47 (m, 1H, PCCH$_{bridgehead}$), 2.57 (d, J$_{PH}$=3.6 Hz, 1H, PCH), 3.04 (m, 1H, NCCH$_{bridgehead}$), 6.83 (s, 2H, CH$_{Ar}$); $^{13}$C{$^1$H}-NMR (75 MHz, C$_6$D$_6$, 25° C.) δ=7.0 (s, CH$_{3Si}$), 7.2 (d, J$_{PC}$=2.0 Hz, CH$_{3Si}$), 20.6 (s, 3C, CH$_3$), 25.6 (s, CH$_2$), 30.3 (s, CH$_2$), 32.2 (d, J$_{PC}$=6.2 Hz, 3C, CH$_{3t\text{-}Bu}$), 32.3 (d, J$_{PC}$=7.5 Hz, 3C, CH$_{3t\text{-}Bu}$), 37.0 (s, CH$_2$), 39.7 (s, NCCH$_{bridgehead}$), 42.1 (s, PCCH$_{bridgehead}$) 50.8 (d, J$_{PC}$=15.8 Hz, C$_{t\text{-}Bu}$), 51.4 (d, J$_{PC}$=8.3 Hz, C$_{t\text{-}Bu}$), 66.5 (d, J$_{PC}$=60.1 Hz, PCH), 128.6 (s, 2C, CH$_{Ar}$), 130.9 (s, 2C, C$_{Ar}$), 148.3 (s, C$_{Ar}$), 148.3 (s, C$_{Ar}$), 180.5 (d, J$_{PC}$=9.4 Hz, N=C); $^{31}$P{$^1$H}-NMR (121 MHz, C$_6$D$_6$, 25° C.) δ=146.5; $^{29}$Si{$^1$H}-NMR (59 MHz, C$_6$D$_6$, 25° C.) δ=18.6 (d, J$_{PSi}$=7.2 Hz).

3-c) Synthesis of the Intermediate Compound 11':

nBuLi (1.6 M, 6.45 mL, 10.32 mmol) is added dropwise with vigorous stirring to a solution of iminophosphine 8' (4.5 g, 9.83 mmol) in 25 mL of THF cooled to −78° C. The lithiated mixture is then stirred for 1 hour at room temperature, followed by cooling again to −78° C. A solution of dichlorogermylene dioxane (2.28 g, 9.83 mmol) in THF (10 mL) is then added dropwise, and the mixture is then stirred at room temperature for 2 hours. Once the solvent has been evaporated off, the solid is extracted with toluene (40 mL) and dried, before being washed with pentane (2×20 mL). Once dried, product 11' (mixture of two isomers) is obtained in the form of a white powder (3.7 g, 86%).

Isomer 1 (78%)

$^1$H-NMR (300 MHz, C$_6$D$_6$, 25° C.) δ=0.24 (s, 3H, CH$_{3Si}$), 0.28 (s, 3H, CH$_{3Si}$), 1.15 (d, J$_{PH}$=0.6 Hz, 9H, CH$_{3t\text{-}Bu}$), 1.13-1.2 (m, 2H, CH$_2$), 1.37 (d, J$_{PH}$=0.9 Hz, 9H, CH$_{3t\text{-}Bu}$), 1.57-1.71 (m, 3H, CH$_2$), 2.11 (m, 1H, CH$_2$), 2.17 (s, 3H, CH$_3$), 2.42 (s, 3H, CH$_3$), 2.53 (m, 1H, PCCH$_{tdp}$), 2.56 (s, 3H, CH$_3$), 3.02 (m, 1H, NCCH$_{tdp}$), 6.78-7.14 (s, 2H, CH$_{Ar}$); $^{13}$C{$^1$H}-NMR (75 MHz, C$_6$D$_6$, 25° C.) δ=4.02 (d, J$_{PC}$=1.5 Hz, CH$_{3Si}$), 5.94 (d, J$_{PC}$=4.8 Hz, CH$_{3Si}$), 20.09 (s, CH$_3$), 20.47 (d, J$_{PC}$=2.5 Hz, CH$_3$), 21.03 (s, CH$_3$), 25.75 (s, CH$_2$), 29.49 (s, CH$_2$), 33.14 (d, J$_{PC}$=3.3 Hz, 3C, CH$_{3t\text{-}Bu}$), 33.23 (d, J$_{PC}$=4.4 Hz, 3C, CH$_{3t\text{-}Bu}$), 40.96 (d, J$_{PC}$=7.2 Hz, CH$_{bridgehead}$), 44.32 (d, J$_{PC}$=14.1 Hz, CH$_{bridgehead}$), 47.08 (d, J$_{PC}$=4.2 Hz, CH$_2$), 51.30 (d, J$_{PC}$=3.0 Hz, C$_{t\text{-}Bu}$), 51.87 (d, J$_{PC}$=3.6 Hz, C$_{t\text{-}Bu}$), 99.25 (d, J$_{PC}$=19.2 Hz, PC), 129.57 (s, CH$_{Ar}$), 130.05 (s, CH$_{Ar}$), 134.42 (s, C$_{Ar}$), 134.80 (s, 2C, C$_{Ar}$), 136.62 (s, C$_{Ar}$), 185.17 (d, J$_{PC}$=42.0 Hz, NC); $^{31}$P{$^1$H}-NMR (121 MHz, C$_6$D$_6$, 25° C.) δ=83.02; $^{29}$Si{$^1$H}-NMR (59 MHz, C$_6$D$_6$, 25° C.) δ=11.44 (d, J$_{PSi}$=4.1 Hz).

Isomer 2 (22%)

$^1$H-NMR (300 MHz, C$_6$D$_6$, 25° C.) δ=0.25 (s, 3H, CH$_{3Si}$), 0.29 (s, 3H, CH$_{3Si}$), 1.20-1.25 (m, 2H, CH$_2$), 1.21 (d, J$_{PH}$=0.3 Hz, 9H, CH$_{3t\text{-}Bu}$), 1.43 (d, J$_{PH}$=0.6 Hz, 9H, CH$_{3t\text{-}Bu}$), 1.45-1.60 (m, 3H, CH$_2$), 2.11 (m, 1H, CH$_2$), 2.16 (s, 3H, CH$_3$), 2.29 (s, 3H, CH$_3$), 2.35 (m, 1H, PCCH$_{tdp}$), 2.65 (s, 3H, CH$_3$), 3.02 (m, 1H, NCCH$_{tdp}$), 6.78-7.14 (m, 2H, CH$_{Ar}$); $^{13}$C{$^1$H}-NMR (75 MHz, C$_6$D$_6$, 25° C.) δ=4.32 (d, J$_{PC}$=1.7 Hz, CH$_{3Si}$), 5.86 (d, J$_{PC}$=5.3 Hz, CH$_{3Si}$), 19.80 (d, J$_{PC}$=1.0 Hz, CH$_3$), 20.23 (s, CH$_3$), 21.03 (s, CH$_3$), 25.67 (s, CH$_2$), 28.95 (s, CH$_2$), 32.90 (d, J$_{PC}$=4.9 Hz, 3C, CH$_{3t\text{-}Bu}$), 33.48 (d, J$_{PC}$=3.1 Hz, 3C, CH$_{3t\text{-}Bu}$), 40.96 (d, J$_{PC}$=7.2 Hz, CH$_{bridgehead}$), 43.82 (d, J$_{PC}$=14.0 Hz, CH$_{bridgehead}$), 49.41 (d, J$_{PC}$=3.1 Hz, CH$_2$), 51.30 (d, J$_{PC}$=3.0 Hz, C$_{t\text{-}Bu}$), 51.89 (d, J$_{PC}$=2.4 Hz, C$_{t\text{-}Bu}$), 101.25 (d, J$_{PC}$=18.8 Hz, PC), 129.17 (s, CH$_{Ar}$), 130.20 (s, CH$_{Ar}$), 135.04 (s, C$_{Ar}$), 135.18 (s, C$_{Ar}$), 136.83 (s, C$_{Ar}$), 140.54 (d, J$_{PC}$=3.0 C$_{Ar}$), 184.46 (d, J$_{PC}$=38.5 Hz, NC); $^{31}$P{$^1$H}-NMR (121 MHz, C$_6$D$_6$, 25° C.) δ=84.26; $^{29}$Si{$^1$H}-NMR (59 MHz, C$_6$D$_6$, 25° C.) δ=11.07 (d, J$_{PSi}$=4.1 Hz).

3-d) Synthesis of the Organic Compound (9):

The organic compound (9) is prepared from the intermediate compound 11' according to the protocol described in example 4-f).

Example 4: Preparation of the Organic Compound (10) According to the Invention

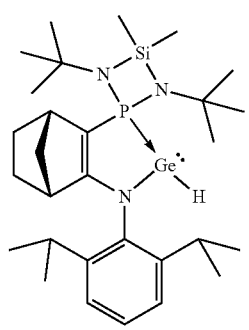

(10)

4-a) Reaction Scheme

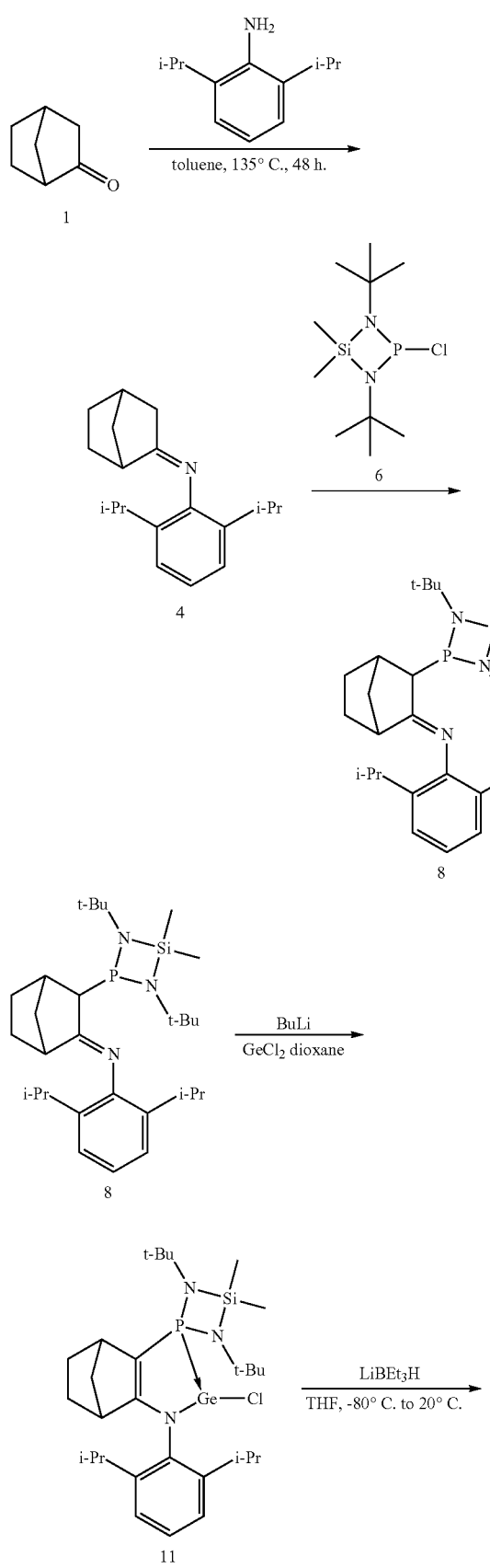

4-b) Synthesis of the Intermediate Compound 4:
As described according to example 1-b).

4-c) Synthesis of the Intermediate Compound 6:

n-BuLi (1.6M) (46.7 mL, 74.47 mmol) is added to a solution of Me$_2$Si(NH$^t$Bu)$_2$ 2 (7.38 g, 36.46 mmol) in 40 mL of THF cooled to −78° C., and the solution is then heated at 50° C. for 4 hours. The reaction mixture is then cooled to −100° C. and PCl$_3$ (3.2 mL, 36.58 mmol) is added dropwise. The reaction is maintained at −100° C. for 2 hours, before returning slowly to room temperature overnight. The solvent is then evaporated off and the product is extracted with pentane (40 mL and then 2×20 mL). After evaporating off the pentane, product 6 is obtained after distillation (7.0 g, 72%) in the form of a transparent oil.

$^1$H NMR (300 MHz, CDCl$_3$, ppm) δ=0.45 (s, 6H, SiCH$_3$), 1.23 (d, J$_{PH}$=1.3 Hz, 18H, CH$_{3t-Bu}$); $^{13}$C NMR {$^1$H} (75 MHz, CDCl$_3$, ppm) δ=5.2 (d, J$_{PC}$=3.6 Hz, SiCH$_3$), 31.9 (d, J$_{PC}$=7.8 Hz, CH$_{3t-Bu}$), 52.0 (d, J$_{PC}$=7.8 Hz, C$_{t-Bu}$); $^{31}$P NMR {$^1$H} (121 MHz, CDCl$_3$, ppm) δ=212.3; $^{29}$Si NMR {$^1$H} (59 MHz, CDCl$_3$, ppm) δ=27.2.

4-d) Synthesis of the Intermediate Compound 8:

nBuLi (1.6 M, 24.3 mL, 39 mmol) is added dropwise with vigorous stirring to a solution of imine 4 (10.0 g, 37.1 mmol) in 80 mL of THF cooled to −78° C. The lithiated mixture is then stirred for 1 hour at room temperature, followed by cooling again to −78° C. The chlorophosphine 6 (9.9 g, 37.1 mmol) is then added dropwise, and the mixture is then stirred at room temperature. Once the solvent has been evaporated off, the solid is washed with acetonitrile (3×80 mL) and then taken up in pentane, filtered and dried to give product 8 in the form of a white powder (17.4 g, 94%).

$^1$H NMR (300 MHz, C$_6$D$_6$, ppm) δ=0.34 (s, 3H, SiCH$_3$), 0.42 (s, 3H, SiCH$_3$), 1.05 (m, 1H, CH$_2$), 1.20 (m, 1H, CH$_2$), 1.22 (s, 9H, CH$_{3t-Bu}$), 1.27 (d, J$_{HH}$=6.8 Hz, 3H, CH$_{3i-Pr}$), 1.32 (d, J$_{HH}$=6.8 Hz, 3H, CH$_{3i-Pr}$), 1.38 (m, 2H, CH$_2$), 1.41 (s, 9H, CH$_{3t-Bu}$), 1.61 (m, 1H, CH$_2$), 1.75 (m, 1H, CH$_2$), 2.56 (d, J$_{HH}$=3.6 Hz, 1H, CH$_{bridgehead}$), 2.62 (d, J$_{HH}$=3.6 Hz, 1H, CH$_{bridgehead}$), 3.06 (m, 1H, CH), 3.09 (m, 1H, CH$_{iPr}$), 3.45 (sept., J$_{HH}$=6.8 Hz, 1H, CH$_{iPr}$), 7.11-7.24 (m, 3H, CH$_{Ar}$); $^{13}$C{1H} (75 MHz, C$_6$D$_6$, ppm) δ=7.2 (s, SiCH$_3$), 7.5 (d, J$_{PC}$=1.7 Hz, SiCH$_3$), 22.3 (s, CH$_{3i\text{-}Pr}$), 23.1 (s, CH$_{3i\text{-}Pr}$), 24.5 (s, CH$_{i\text{-}Pr}$), 24.9 (s, CH$_{3i\text{-}Pr}$), 25.1 (s, CH$_2$), 27.9 (d, J$_{PC}$=3.6 CH$_{i\text{-}Pr}$), 28.5 (s, CH$_{3i\text{-}Pr}$), 30.5 (s, CH$_2$), 32.3 (d, J$_{PC}$=5.9 Hz, CH$_{3t\text{-}Bu}$) 32.4 (d, J$_{PC}$=7.4 Hz, CH$_{3t\text{-}Bu}$), 37.3 (s, CH$_2$), 40.2 (s, CH$_{bridgehead}$), 42.1 (s, CH$_{bridgehead}$), 51.0 (d, J$_{PC}$=15.7 Hz, C$_{t\text{-}Bu}$), 51.6 (d, J$_{PC}$=8.0 Hz, C$_{t\text{-}Bu}$), 66.4 (d, J$_{PC}$=59.8 Hz, PCH), 122.7 (s, CH$_{ar}$), 123.2 (s, CH$_{ar}$), 123.4 (s, CH$_{ar}$), 136.7 (d, J$_{PC}$=1.3 Hz, C$_{ar}$), 136.8 (d, J$_{PC}$=0.9 Hz, C$_{ar}$), 148.0 (s, C$_{ar}$), 180.6 (d, J$_{PC}$=10.3 Hz, C=N); $^{31}$PNMR {1H} (121 MHz, C$_6$D$_6$, ppm) δ=147.3; $^{29}$Si NMR {1H} δ=(59 MHz, C$_6$D$_6$, ppm) 19.1 (d, J$_{Psi}$=3.7 Hz).

4-e) Synthesis of the Intermediate Compound 11:

nBuLi (1.6 M, 6.9 mL, 11 mmol) is added dropwise with vigorous stirring to a solution of iminophosphine 8 (5.0 g, 10 mmol) in 40 mL of THF cooled to −78° C. The lithiated mixture is then stirred for 1 hour at room temperature, followed by cooling again to −78° C. A solution of dichlorogermylene dioxane (2.32 g, 10 mmol) in THF (10 mL) is then added dropwise, and the mixture is then stirred at room temperature. Once the solvent has been evaporated off, the solid is extracted with toluene (40 mL) and dried, before being washed with pentane (2×20 mL). Once dried, product 11 is obtained in the form of a white powder (5.7 g, 94%, mixture of two isomers).

Major isomer LGeCl (64%):
$^1$H-NMR (300 MHz, C$_6$D$_6$, 25° C.) δ=0.22 (s, 3H, SiCH$_3$), 0.27 (s, 3H, SiCH$_3$), 1.17 (s, 9H, CH$_{3tBu}$), 1.19 (d, J$_{HH}$=9.1 Hz, 1H, CH$_2$), 1.24 (d, J$_{HH}$=6.7 Hz, 3H, CH$_{3iPr}$), 1.29 (d, J$_{HH}$=6.7 Hz, 3H, CH$_{3iPr}$), 1.29 (d, J$_{HH}$=7.1 Hz, 1H, CH$_2$), 1.33 (d, J$_{HH}$=7.1 Hz, 1H, CH$_2$), 1.38 (d, J$_{HH}$=6.7 Hz, 3H, CH$_{3iPr}$), 1.39 (s, 9H, CH$_{3tBu}$), 1.60 (d, J$_{HH}$=6.0 Hz, 3H, CH$_{3iPr}$), 1.64 (m, 2H, CH$_2$), 1.67 (d, J$_{HH}$=9.1 Hz, 1H, CH$_2$), 2.58 (b, 1H, CH$_{bridgehead}$), 3.05 (b, 1H, CH$_{bridgehead}$), 3.47 (sept., J$_{HH}$=6.9 Hz, 1H, CH$_{iPr}$), 3.68 (sept., J$_{HH}$=6.9 Hz, 1H, CH$_{iPr}$), 7.13-7.23 (m, 3H, CH$_{Ar}$); $^{13}$C{1H}-NMR (75 MHz, C$_6$D$_6$, 25° C.) δ=3.6 (d, J$_{PC}$=1.3 Hz, SiCH$_3$), 5.5 (d, J$_{PC}$=5.0 Hz, SiCH$_3$), 24.3 (s, CH$_{3iPr}$), 24.6 (s, CH$_{3iPr}$), 25.2 (d, J$_{PC}$=1.3 Hz, CH$_2$), 25.5 (s, CH$_{3iPr}$), 26.1 (d, J$_{PC}$=2.1 Hz, CH$_{3iPr}$), 27.7 (s, CH$_{iPr}$), 28.4 (s, CH$_{iPr}$), 29.0 (d, J$_{PC}$=1.5 Hz, CH$_2$), 32.7 (d, J$_{PC}$=3.0 Hz, CH$_{3tBu}$), 32.8 (d, J$_{PC}$=4.2 Hz, CH$_{3tBu}$), 40.6 (d, J$_{PC}$=7.0 Hz, CH$_{bridgehead}$), 43.8 (d, J$_{PC}$=14 Hz, CH$_{bridgehead}$), 46.5 (d, J$_{PC}$=5.2 Hz, CH$_2$), 51.0 (d, J$_{PC}$=2.9 Hz, C$_{tBu}$), 51.5 (d, J$_{PC}$=3.0 Hz, C$_{tBu}$), 98.9 (d, J$_{PC}$=21 Hz, PC), 123.7 (s, CH$_{Ar}$), 124.2 (s, CH$_{Ar}$), 126.7 (s, CH$_{Ar}$), 139.1 (d, J$_{PC}$=3.9 Hz, C$_{Ar}$), 145.5 (s, C$_{Ar}$), 147.5 (s, C$_{Ar}$), 184.6 (d, J$_{PC}$=42 Hz, NC); $^{31}$P{1H}-NMR (121 MHz, C$_6$D$_6$, 25° C.) δ=83.6 (s); $^{29}$Si{1H}-NMR (59 MHz, C$_6$D$_6$, 25° C.) δ=11.1 (d, J$_{PSi}$=4.1 Hz).

Minor Isomer LGeCl (36%):
$^1$H-NMR (300 MHz, C$_6$D$_6$, 25° C.) δ=0.23 (s, 3H, SiCH$_3$), 0.27 (s, 3H, SiCH$_3$), 1.20 (s, 9H, CH$_{3tBu}$), 1.22 (d, J$_{HH}$=9.0 Hz, 1H, CH$_2$), 1.24 (d, J$_{HH}$=6.6 Hz, 3H, CH$_{3iPr}$), 1.30 (d, J$_{HH}$=6.9 Hz, 3H, CH$_{3iPr}$), 1.34 (d, J$_{HH}$=6.9 Hz, 1H, CH$_2$), 1.35 (d, J$_{HH}$=7.0 Hz, 1H, CH$_2$), 1.39 (d, J$_{HH}$=6.9 Hz, 3H, CH$_{3iPr}$), 1.41 (s, 9H, CH$_{3tBu}$), 1.61 (d, J$_{HH}$=6.3 Hz, 3H, CH$_{3iPr}$), 1.58-1.71 (m, 3H, CH$_2$), 2.40 (b, 1H, CH$_{bridgehead}$), 3.05 (b, 1H, CH$_{bridgehead}$), 3.22 (sept., J$_{HH}$=6.9 Hz, 1H, CH$_{iPr}$), 4.00 (sept., J$_{HH}$=6.9 Hz, 1H, CH$_{iPr}$), 7.13-7.27 (m, 3H, CH$_{Ar}$); $^{13}$C{1H}-NMR (75 MHz, C$_6$D$_6$, 25° C.) δ=3.9 (d, J$_{PC}$=1.3 Hz, SiCH$_3$), 5.5 (d, J$_{PC}$=5.0 Hz, SiCH$_3$), 23.9 (s, CH$_{3iPr}$), 25.2 (s, CH$_{3iPr}$), 25.4 (s, CH$_{3iPr}$), 25.6 (d, J$_{PC}$=1.3 Hz, CH$_2$), 26.1 (d, J$_{PC}$=2.1 Hz, CH$_{3iPr}$), 27.6 (s, CH$_{iPr}$), 28.4 (s, CH$_{iPr}$), 28.6 (d, J$_{PC}$=1.5 Hz, CH$_2$), 32.4 (d, J$_{PC}$=4.0 Hz, CH$_{3tBu}$), 32.9 (d, J$_{PC}$=2.9 Hz, CH$_{3tBu}$), 40.6 (d, J$_{PC}$=7.0 Hz, CH$_{bridgehead}$), 43.3 (d, J$_{PC}$=14 Hz, CH$_{bridgehead}$), 48.7 (d, J$_{PC}$=6.0 Hz, CH$_2$), 51.5 (d, J$_{PC}$=3.9 Hz, 2C, C$_{tBu}$), 98.9 (d, J$_{PC}$=21 Hz, PC), 123.7 (s, CH$_{Ar}$), 124.4 (s, CH$_{Ar}$), 126.8 (s, CH$_{Ar}$), 139.5 (s, C$_{Ar}$), 145.9 (s, C$_{Ar}$), 147.8 (s, C$_{Ar}$), 184.5 (d, J$_{PC}$=23 Hz, NC); $^{31}$P{1H}-NMR (121 MHz, C$_6$D$_6$, 25° C.) δ=84.4 (s); $^{29}$Si{1H}-NMR (59 MHz, C$_6$D$_6$, 25° C.) δ=11.0 (d, J$_{PSi}$=4.3 Hz).

4-f) Preparation of the Organic Compound (10)

A solution of LiBEt$_3$H (1.0 M, 5.4 mL, 5.4 mmol) is added to a solution of chlorogermylene 11 (3.3 mg, 5.4 mmol) in 20 mL of THF cooled to −78° C., and the mixture is stirred at −78° C. for 30 minutes and then at room temperature for 30 minutes. Once the various volatile compounds have been evaporated off, the solid is extracted with pentane (30 mL) and the mixture is then concentrated (to about 10 mL) and the organic compound (10) is obtained in the form of white crystals (1.5 g, 48%) after crystallization at −30° C. m.p.: 150-152° C. (decomposition), IR (Ge—H bond)=1814 cm$^{-1}$, UV: peaks at 239, 288 and 335 nm.

Example 5: Preparation of the Organic Compound (11) According to the Invention (11)

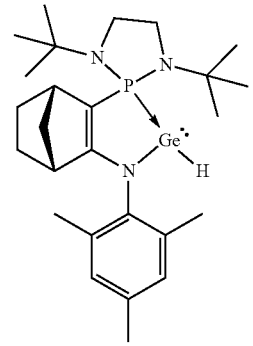

5-a) Reaction Scheme:

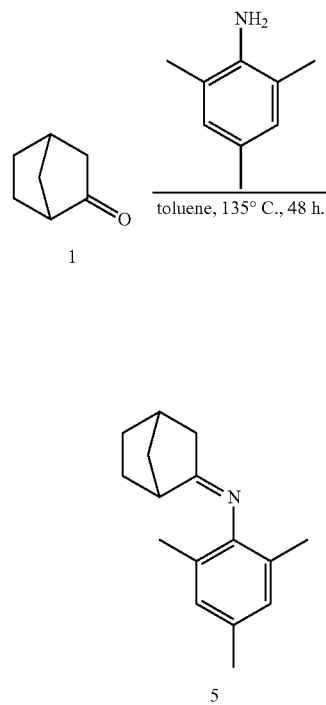

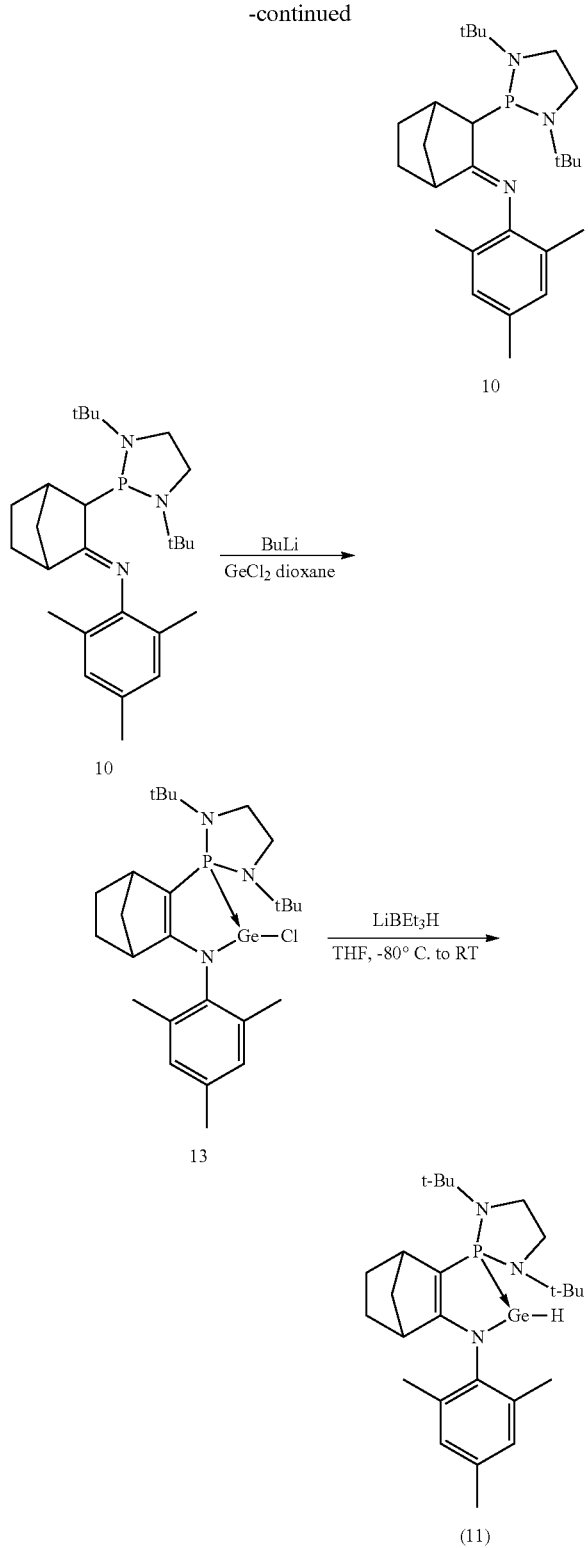

5-b) Synthesis of the Intermediate Compound 5:

Norcamphor 1 (22.3 g, 0.2 mol), 2,4,6-trimethylaniline (28 mL, 0.2 mol), a catalytic amount of para-toluenesulfonic acid (0.38 g) and toluene (100 mL) are placed in a 250 mL two-necked round-bottomed flask equipped with a condenser and Dean-Stark apparatus. The mixture is refluxed for 4 days at 135° C. The solvent is evaporated off and the oily residue is taken up in acetone and filtered to remove the small amount of solid formed. The solvent is then evaporated off to give product 5 in the form of a yellow oil (mixture of two isomers), which is subsequently used without further purification.

Isomer 1:

$^1$H-NMR (300 MHz, $C_6D_6$, 25° C.) δ=1.32-1.39 (m, 1H, $CH_2$), 1.50-1.56 (m, 2H, $CH_2$), 1.64-1.68 (m, 1H, $CH_2$), 1.72-1.80 (m, 3H, $CH_2$), 1.86-1.92 (m, 1H, $CH_2$), 2.03 (s, 6H, $CH_3$), 2.28 (s, 3H, $CH_3$), 2.51 (m, 1H, $CH_{tdp}$), 3.05 (m, 1H, $CH_{tdp}$), 6.85 (br s, 2H, $CH_{Ar}$); $^{13}C\{^1H\}$-NMR (75 MHz, $C_6D_6$, 25° C.) δ=17.4 (s, $CH_3$), 17.5 (s, $CH_3$), 20.6 (s, $CH_3$), 26.6 (s, $CH_2$), 27.5 (s, $CH_2$), 35.6 (s, $CH_{tdp}$), 38.3 (s, $CH_2$), 39.1 (s, $CH_2$), 46.9 (s, $CH_{tdp}$), 125.4 (s, $C_{Ar}$), 125.8 (s, $C_{Ar}$), 128.4 (s, $CH_{Ar}$), 128.5 (s, $CH_{Ar}$), 131.6 (s, $C_{Ar}$), 146.1 (s, $C_{Ar}$), 182.2 (s, C=N) Isomer 2:

$^1$H-NMR (300 MHz, $C_6D_6$, 25° C.) δ=1.32-1.39 (m, 1H, $CH_2$), 1.42-1.46 (m, 2H, $CH_2$), 1.50-1.56 (m, 1H, $CH_2$), 1.64-1.68 (m, 1H, $CH_2$), 1.76-1.78 (m, 1H, $CH_2$), 2.04 (s, 3H, $CH_3$), 2.10 (s, 3H, $CH_3$), 2.19 (m, 1H, $CH_2$), 2.25 (m, 1H, $CH_2$), 2.30 (s, 3H, $CH_3$), 2.51 (m, 1H, $CH_{tdp}$), 2.61 (m, 1H, $CH_{tdp}$), 6.86 (br s, 2H, $CH_{Ar}$); $^{13}C\{^1H\}$-NMR (75 MHz, $C_6D_6$, 25° C.) δ=17.9 (s, $CH_3$), 18.1 (s, $CH_3$), 20.6 (s, $CH_3$), 24.9 (s, $CH_2$), 27.6 (s, $CH_2$), 35.2 (s, $CH_{tdp}$), 38.2 (s, $CH_2$), 41.5 (s, $CH_2$), 42.0 (s, $CH_{tdp}$), 125.5 (s, $C_{Ar}$), 126.4 (s, $C_{Ar}$), 128.3 (s, $CH_{Ar}$), 128.3 (s, $CH_{Ar}$), 131.6 (s, $C_{Ar}$), 146.8 (s, $C_{Ar}$), 181.5 (s, C=N).

5-c) Synthesis of the Intermediate Compound 7:

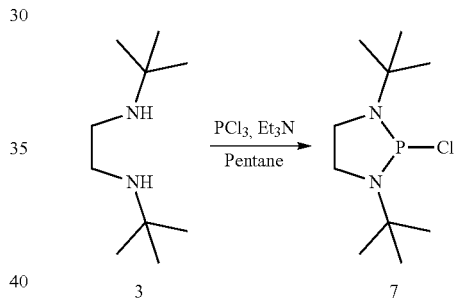

A solution of diamine 3 (5.93 g, 34 mmol) and of triethylamine (9.62 mL, 70 mmol) in 10 mL of toluene is added to a solution of $PCl_3$ (3 mL, 34 mmol) in toluene (20 mL) cooled to 0° C. The mixture is then stirred over the weekend at room temperature. After filtration and extraction with pentane (2×20 mL), the filtrates are combined and dried to give product 7 in the form of a white powder (6.5 g, 81%).

$^1$H-NMR (300 MHz, $C_6D_6$, 25° C.) δ=1.24 (d, $J_{HH}$=2.11 Hz, 12H, $CH_3$), 2.84 (d, $J_{PH}$=6.65 Hz, 2H, $CH_2$), 3.08 (s, 2H, $CH_2$); $^{31}P\{^1H\}$-NMR (75 MHz, $C_6D_6$, 25° C.) δ=168.22.

5-d) Synthesis of the Intermediate Compound 10:

nBuLi (1.6 M, 16.3 mL, 26 mmol) is added dropwise with vigorous stirring to a solution of imine 5 (5.86 g, 25.8 mmol) in 35 mL of THF cooled to −78° C. The lithiated mixture is then stirred for 1 hour at room temperature, followed by cooling again to −78° C. The chlorophosphine 7 (6.1 g, 25.8 mmol) is then added dropwise, and the mixture is then stirred at room temperature. Once the solvent has been evaporated off, the solid is extracted with pentane (50 mL) and with ether (50 mL) and dried. The product is then washed with acetonitrile (3×30 mL) and dried again to give product 10 in the form of a white powder (9.1 g, 86%).

$^1$H-NMR (300 MHz, $C_6D_6$, 25° C.) δ=1.06 (n, $J_{PH}$=10 Hz, 1H, $CH_2$), 1.2 (s, 9H, $CH_{3tBu}$), 1.3 (m, 3H, $CH_2$), 1.38 (s, 9H, $CH_{3tBu}$), 1.55 (m, 3H, $CH_2$), 1.87 (d, $J_{HH}$=10 Hz, 1H,

PCH), 2.2 (s, 3H, CH$_{mes}$), 2.22 (s, 3H, CH$_{mes}$), 2.3 (s, 3H, CH$_{mes}$), 2.4 (d, J$_{HH}$=3 Hz, 1H, CH$_{bridgehead}$), 2.55 (m, 1H, CH$_{bridgehead}$), 2.77 (m, 2H, NCH$_2$), 2.88 (m, 1H, CH$_2$), 3.04 (n, 1H, CH$_2$), 6.84 (s, 1H, CH$_{Ar}$), 6.87 (s, 1H, CH$_{Ar}$); $^{13}$C{$^1$H}-NMR (75 MHz, C$_6$D$_6$, 25° C.) δ=18.56 (s, CH$_{3mes}$), 18.62 (s, CH$_{3mes}$), 20.57 (s, CH$_{3mes}$), 26.36 (d, J$_{PC}$=1.95 Hz, CH$_2$), 29.27 (d, J$_{PC}$=1.6 Hz, CH$_2$), 29.7 (d, J$_{PC}$=10.6 Hz, CH$_{3tBu}$), 30.01 (d, J$_{PC}$=9.5 Hz, CH$_{3tBu}$), 36.28 (d, J$_{PC}$=3.8 Hz, CH$_2$), 40.43 (d, J$_{PC}$=3.6 Hz CH$_{bridgehead}$), 42.51 (d, J$_{PC}$=1 Hz CH$_{bridgehead}$), 45.3 (d, J$_{PC}$=9.4 Hz, NCH$_2$), 47.17 (d, J$_{PC}$=6.6 Hz, NCH$_2$), 53.47 (d, J$_{PC}$=14 Hz, C$_{tBu}$), 53.86 (d, J$_{PC}$=19 Hz, C$_{tBu}$), 55.9 (d, J$_{PC}$=38 Hz, PCH), 125.08 (s, C$_{Ar}$), 126.9 (s, C$_{Ar}$), 128.75 (s, CH$_{mes}$), 128.99 (s, CH$_{mes}$), 125.08 (s, C$_{Ar}$), 148.52 (s, NC$_{Ar}$), 181.5 (d, J$_{PC}$=9.0 Hz, N=C); $^{31}$P{$^1$H}-NMR (121 MHz, C$_6$D$_6$, 25° C.) δ=90.

5-e) Synthesis of the Intermediate Compound 13:

nBuLi (1.6 M, 2.25 mL, 3.6 mmol) is added dropwise with vigorous stirring to a solution of iminophosphine 10 (1.6 g, 3.4 mmol) in 10 mL of THF cooled to −78° C. The lithiated mixture is then stirred for 1 hour at room temperature, followed by cooling again to −78° C. A solution of dichlorogermylene dioxane (0.8 g, 3.4 mmol) in THF (5 mL) is then added dropwise, and the mixture is then stirred at room temperature. Once the solvent has been evaporated off, the solid is extracted with pentane (20 mL) and with ether (20 mL) and the mixture is then concentrated. Product 13 is obtained in the form of yellow crystals (1.0 g, 52%, mixture of two isomers) after crystallization at −30° C.

Isomer 1 (70%)

$^1$H-NMR (300 MHz, C$_6$D$_6$, 25° C.) δ=1.08 (m, 1H, CH$_2$), 1.15 (m, 1H, CH$_{2bridge}$), 1.17 (s 6H, CH$_{tBu}$), 1.39 (s, 1H, CH$_2$), 1.47 (s, 9H, CH$_{3tBu}$), 1.56 (m, 2H, CH$_2$), 1.69 (m, 1H, CH$_{2bridge}$), 2.18 (s, 3H, CH$_{3mes}$), 2.4 (s, 3H, CH$_{3mes}$), 2.46 (m, 1H, CH$_{bridgehead}$), 2.52 (s, 3H, CH$_{3mes}$), 2.6 (m, 2H, CH$_2$), 2.7 (m, 2H, CH$_2$), 2.96 (m, 1H, CH$_{bridgehead}$), 6.82 (m, 1H, CH$_{Ar}$), 6.87 (m, 1H, CH$_{Ar}$). $^{13}$C{$^1$H}-NMR (75 MHz, C$_6$D$_6$, 25° C.) δ=20.19 (s, CH$_{3mes}$), 20.63 (s, CH$_{3mes}$), 21.03 (s, CH$_{3mes}$), 25.23 (s, CH$_2$), 29.38 (s, CH$_2$), 29.9 (d, J$_{PC}$=1.6 Hz CH$_{3tBu}$), 30.16 (d, J$_{PC}$=3.0 Hz CH$_{3tBu}$), 41.56 (d, J$_{PC}$=8.9 Hz CH$_{bridgehead}$), 43.18 (s, CH$_2$), 44.18 (d, J$_{PC}$=13.65 Hz CH$_{bridgehead}$), 47.11 (d, J$_{PC}$=4.21 Hz CH$_{2bridge}$), 53.11 (d, J$_{PC}$=7.38 Hz C$_{tBu}$), 54.11 (d, J$_{PC}$=8.34 Hz C$_{tBu}$), 94.84 (d, J$_{PC}$=24.5 Hz, PC), 129.67 (s, CH$_{Ar}$), 130.07 (s, CH$_{Ar}$), 134.43 (s, C$_{Ar}$), 134.69 (s, C$_{Ar}$), 136.54 (s, C$_{Ar}$), 140.88 (d, J$_{PC}$=3.6 Hz NC$_{Ar}$), 184.57 (d, J$_{PC}$=43.48 Hz, NC); $^{31}$P{$^1$H}-NMR (121 MHz, C$_6$D$_6$, 25° C.) δ=71.4.

Isomer 2 (30%)

$^1$H-NMR (300 MHz, C$_6$D$_6$, 25° C.) δ=1.11 (m, 1H, CH$_{2bridge}$), 1.18 (m, 2H, CH$_2$), 1.24 (s, 9H, CH$_{3tBu}$), 1.47 (s, 9H, CH$_{3tBu}$), 1.52 (m, 1H, CH$_2$), 1.55 (m, 1H, CH$_2$), 1.68 (m, 1H, CH$_{2bridge}$), 2.17 (s, 3H, CH$_{3mes}$), 2.26 (s, 3H, CH$_{3mes}$), 2.3 (m, 1H, CH$_{bridgehead}$), 2.57 (m, 2H, CH$_2$), 2.63 (s, 3H, CH$_{3mes}$), 2.8 (m, 2H, CH$_2$), 2.96 (m, 1H, CH$_{bridgehead}$), 6.79 (m, 1H, CH$_{Ar}$), 6.87 (m, 1H, CH$_{Ar}$); $^{13}$C{$^1$H}-NMR (75 MHz, C$_6$D$_6$, 25° C.) δ=19.98 (s, CH$_{3mes}$), 20.45 (s, CH$_{3mes}$), 21.03 (s, CH$_{3mes}$), 25.28 (s, CH$_2$), 28.7 (s, CH$_2$), 29.64 (d, J$_{PC}$=4.0 Hz CH$_{3tBu}$), 30.6 (d, J$_{PC}$=1.0 Hz CH$_{3tBu}$), 42.38 (d, J$_{PC}$=8.3 Hz CH$_{bridgehead}$), 43.6 (s, CH$_2$), 43.64 (s, CH$_2$), 43.82 (s, CH$_{bridgehead}$), 49.22 (d, J$_{PC}$=5.8 Hz, CH$_{2bridge}$), 53.47 (d, J$_{PC}$=4.76 Hz, C$_{tBu}$), 53.82 (d, J$_{PC}$=9.3 Hz, C$_{tBu}$), 97.92 (d, J$_{PC}$=22.6 Hz, PC), 129.26 (s, CH$_{Ar}$), 130.34 (s, CH$_{Ar}$), 135.08 (s, C$_{Ar}$), 135.1 (s, C$_{Ar}$), 137.07 (s, C$_{Ar}$), 141.06 (d, J$_{PC}$=5.8 Hz NC$_{Ar}$), 183.16 (d, J$_{PC}$=40.0 Hz, NC); $^{31}$P{$^1$H}-NMR (121 MHz, C$_6$D$_6$, 25° C.) δ=74.36.

5-f) Synthesis of the Organic Compound (11)

A solution of LiBEt$_3$H (1.0 M, 1.23 mL, 1.23 mmol) is added to a solution of chlorogermylene 13 (657 mg, 1.23 mmol) in 10 mL of THF cooled to −78° C., and the mixture is stirred at −78° C. for 30 minutes and then at room temperature for 30 minutes. Once the various volatile compounds have been evaporated off, the solid is extracted with pentane (30 mL) and the solution is concentrated (to about 5 mL). The organic compound (11) is obtained in the form of yellow crystals (200 mg, 32%) after crystallization at −30° C.

Example 6: Synthesis of the Comparative Organic Compound D$_H$

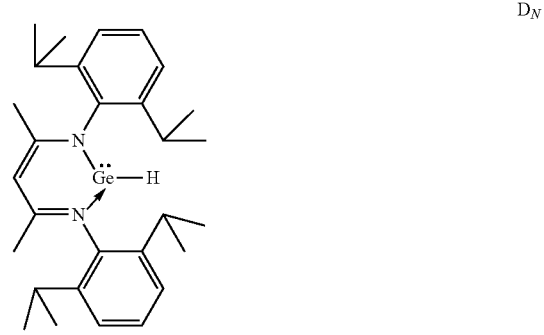

D$_N$ 6-a) Reaction Scheme:

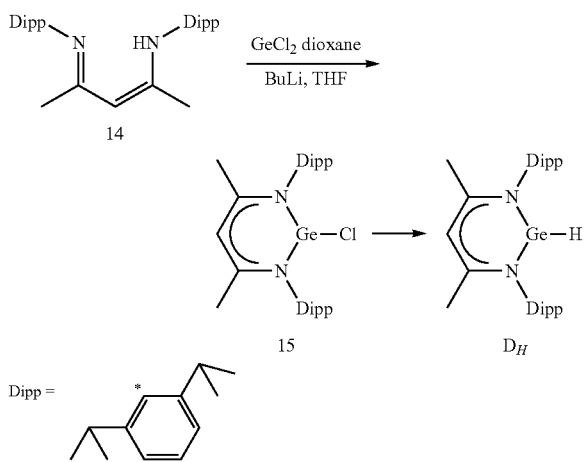

The symbol "*" in the reaction scheme indicates the site of attachment of the group denoted by the abbreviation "Dipp".

6-b) Synthesis of the Intermediate Compound 15:

nBuLi (1.6 M, 6.3 mL, 10.5 mmol) is added dropwise with vigorous stirring to a solution of β-diketiminate 14 (4.2 g, 10 mmol) in 20 mL of THF cooled to −78° C. The lithiated mixture is then stirred for 1 hour at room temperature, followed by cooling again to −78° C. A solution of dichlorogermylene dioxane (2.32 g, 10.0 mmol) in THF (10 mL) is then added dropwise, and the mixture is then warmed to room temperature over 1 hour 30 minutes and then stirred for 1 hour. Once the solvent has been evaporated off, the solid is extracted with toluene (15 mL) and with pentane (15 mL) and the mixture is then dried. Product 15 is obtained in the form of a yellow powder (5.0 g, 95%) after washing with pentane (2×20 mL) and drying.

$^1$H-NMR (300 MHz, C$_6$D$_6$, 25° C.) δ=0.99 (d, J$_{HH}$=6.6 Hz, 6H, CH(CH$_3$)$_2$), 1.18 (d, 12H, CH(CH$_3$)$_2$), 1.43 (d, J$_{HH}$=6.6 Hz, 6H, CH(CH$_3$)$_2$), 1.57 (s, 6H, CH$_3$), 3.12 (sept, J$_{HH}$=6.9 Hz, 2H, CH(CH$_3$)$_2$), 3.87 (sept, J$_{HH}$=6.6 Hz, 2H, CH(CH$_3$)$_2$), 5.12 (s, 1H, CH), 7.01-7.17 (m, 6H, CH$_{Ar}$); $^{13}$C{$^1$H}-NMR (75 MHz, C$_6$D$_6$, 25° C.) δ=23.28, 24.04, 24.43, 24.64, 27.71, 28.18, 29.40, 100.63, 123.99 (s, CH$_{Ar}$), 125.49 (s, CH$_{Ar}$), 128.03 (s, CH$_{Ar}$), 139.62 (s, C), 143.49 (s, C$_{Ar}$), 147.07 (s, C$_{Ar}$), 164.88 (s, C$_{Ar}$).

6-c) Synthesis of the Comparative Organic Compound DA:

A solution of K[HB(secBu)$_3$] (1.0 M in THF, 4.0 mL) is added to a solution of chlorogermylene 15 (1.77 mg, 3.37 mmol) in 20 mL of THF cooled to −10° C., and the mixture is stirred at room temperature for 3 hours (color change from yellow to red). Once the various volatile compounds have been evaporated off, the solid is extracted with pentane (30 mL) and the solution is concentrated (to about 10 mL). Product D$_H$ is obtained in the form of red crystals (79%) after crystallization at −30° C.

$^1$H-NMR (300 MHz, C$_6$D$_6$, 25° C.) δ=1.17 (d, 12H, CH(CH$_3$)$_2$), 1.28 (d, J$_{HH}$=6.6 Hz, 6H, CH(CH$_3$)$_2$), 1.36 (d, J$_{HH}$=6.9 Hz, 6H, CH(CH$_3$)$_2$), 1.55 (s, 6H, CH$_3$), 3.37 (sept, J$_{HH}$=6.6 Hz, 2H, CH(CH$_3$)$_2$), 3.59 (sept, J$_{HH}$=6.9 Hz, 2H, CH(CH$_3$)$_2$), 4.92 (s, 1H, CH), 7.05-7.15 (m, 6H, CH$_{Ar}$), 8.07 (s, 1H, GeH); $^1$C{$^1$H}-NMR (75 MHz, C$_6$D$_6$, 25° C.) δ=22.79, 23.63, 24.33, 24.79, 26.96, 28.12, 28.92, 97.77, 124.17 (s, CH$_{Ar}$), 124.55 (s, CH$_{Ar}$), 127.18 (s, CH$_{Ar}$), 141.52 (s, C), 143.32 (s, C$_{Ar}$), 146.38 (s, C$_{Ar}$), 167.43 (s, C$_{Ar}$).

Example 7: Study of the Catalytic Activity of the Organic Compounds (7), (10) and (11) According to the Invention Versus the Organic Compound D$_H$ (Comparative) on the Hydrosilylation Reaction of Trifluoroacetophenone with Phenylsilane 7-a) General Procedure for the Catalytic Reactions

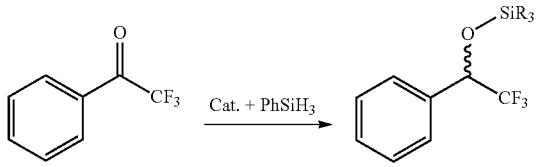

The catalyst (Cat., 0.025 mmol), 0.2 mL of C$_6$D$_6$ or of toluene and the substrates phenylsilane (PhSiH$_3$, 1.0 mmol) and trifluoroacetophenone (1.0 mmol) are added, in order, into a Wilmad pressure NMR tube. The tube is then heated to various temperatures and the reaction is monitored by NMR. Once the reaction is complete, the mixture is hydrolyzed in aqueous HCl solution (2 mL, 1N) and THF (2 mL) for 4 hours, and the product is then extracted in dichloromethane (2×10 mL).

The organic phases are combined and washed (brine) and then dried, and the solvent is evaporated off. The product is then characterized by NMR and GC-MS. The percentages of conversion of the substrates were calculated by NMR and GC-MS. The results are given in Table 1.

7-b) Blank (Control Reaction)

0.2 mL of toluene and the substrates phenylsilane (1.0 mmol) and trifluoroacetophenone (1.0 mmol), without catalyst, are added to a Wilmad pressure NMR tube. The tube is then heated at 120° C. for 24 hours and the reaction is monitored by NMR. A conversion of only 4% is observed.

7-c) Results

TABLE 1

Results of the catalytic activity of the organic compounds (7), (10) and (11) according to the invention versus the organic compound D$_H$ (comparative) on the hydrosilylation reaction of trifluoroacetophenone with phenylsilane

| Substrate | Test catalyst | Reaction temperature (° C.) | Reaction time | % conversion |
|---|---|---|---|---|
| 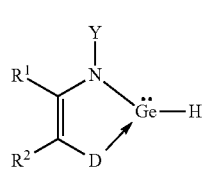 | (10) | 15° C. | 24 h | No reaction |
| | | 80° C. | 7 days | 97% |
| | | 120° C. | 3 h | 100% |
| | (7) | 15° C. | 90 min | 100% |
| | (11) | 15° C. | 20 min | 100% |
| | D$_H$ | 15° C. | 24 h | No reaction |
| | | 80° C. | 3 days | 43% |
| | | 120° C. | 3 days | 100% |

Although the chemical structures of the organic compounds (7), (10) and (11) according to the invention are similar to compound D$_H$ (comparative), it is noted that:

1) the organic compounds (7) and (11) have, at a reaction temperature equal to 15° C., a degree of conversion of 100% after 90 and 20 minutes, respectively, whereas, for compound D$_H$ (comparative), there is no reaction even after 24 hours; and 2) at a reaction temperature of 120° C., the organic compound (7) has a degree of conversion of 100% after 3 hours of reaction, whereas, for compound D$_H$ (comparative), a reaction time of three days is required.

The invention claimed is:

1. An organic compound represented by formula (1):

(1)

$$\begin{array}{c} Y \\ R^1 \diagdown N \diagup \\ \phantom{R^1}\diagdown \ddot{Ge}\text{—H} \\ R^2 \diagup D \diagup \end{array}$$

wherein:
"Ge", "N" and "H" represent, respectively, a germanium atom, a nitrogen atom and a hydrogen atom, Y is an alkyl group containing from 1 to 12 carbon atoms or an aryl group containing from 6 to 18 carbon atoms, R$^1$ and R$^2$, which may be identical or different, represent a hydrogen atom, an alkyl group containing from 1 to 20 carbon atoms, an alkenyl group containing from 2 to 12 carbon atoms, an aryl group containing from 6 to 18 carbon atoms, or R$^1$ and R$^2$ are connected via a covalent bond so as to form a ring or a bicycle, which is optionally substituted, containing from 5 to 8 atoms, the symbol ⟿ represents a covalent coordination bond due to the presence in the ligand D of a lone pair of electrons, and D is a ligand which is a donor group comprising a lone pair of electrons, and preferably D is a ligand which is phosphine, sulfide or iminophosphorane group including a lone pair of electrons.

2. An organic compound as claimed in claim 1, wherein the ligand D is selected from the group consisting of:
a phosphine group of formula (2) below:

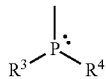

(2)

wherein:
  R³ and R⁴, which may be identical or different, represent a hydrogen atom, a halogen atom, a haloalkyl group containing from 1 to 20 carbon atoms, an alkyl group containing from 1 to 20 carbon atoms and optionally one or more nitrogen or silicon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms, and when R³ and R⁴ are alkyl groups containing from 1 to 20 carbon atoms and optionally one or more nitrogen and/or silicon atoms, or said groups R³ and R⁴ may be linked via a covalent bond so as to form, with the phosphorus atom, a ring of 4, 5 or 6 atoms optionally substituted with one or more alkyl groups containing from 1 to 10 carbon atoms;
a sulfide group of formula (3) below:

(3)

wherein:
  R⁵ represents a hydrogen atom, a halogen atom, an alkyl or haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; or R⁵ forms, with the atoms to which it is attached, a monocyclic or polycyclic ring consisting of 3 to 20 atoms; and
an iminophosphorane group of formula (4) below:

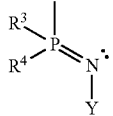

(4)

wherein:
  Y¹ represents an alkyl group containing from 1 to 30 carbon atoms or an aryl group containing from 6 to 18 carbon atoms,
  R³ and R⁴, which may be identical or different, represent a hydrogen atom, a halogen atom, an alkyl or a haloalkyl group containing from 1 to 20 carbon atoms, a cycloalkyl group containing from 3 to 20 carbon atoms, a cycloalkyl-alkyl group containing from 4 to 40 carbon atoms, an aryl group containing from 6 to 18 carbon atoms, an aryl-alkyl group containing from 6 to 38 carbon atoms; or R³ and R⁴ form, either together or with the atoms to which they are attached, a monocyclic or polycyclic ring consisting of 3 to 20 atoms and optionally containing one or more nitrogen or silicon atoms.

3. An organic compound according to claim 2, wherein the ligand D is a phosphine group of formula (2).

4. An organic compound as claimed in claim 1, wherein the ligand D is a phosphine group of formula (5) or (6) below:

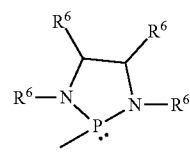

(5)

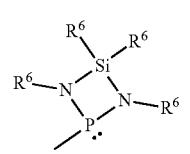

(6)

wherein R⁶ are identical or different and represent an alkyl group containing from 1 to 10 carbon atoms.

5. An organic compound of formula (7), (8), (9), (10), (11), (12) or (13):

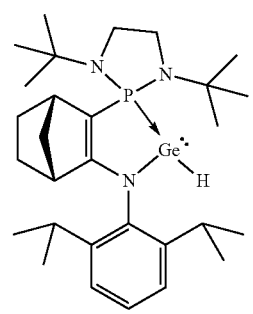

(7)

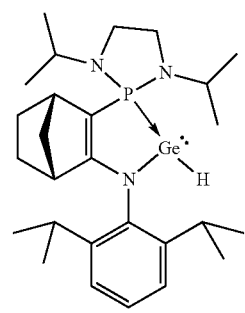

(8)

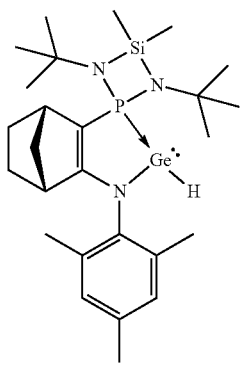
(9)
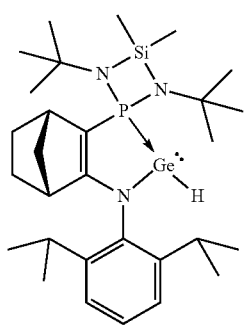
(10)
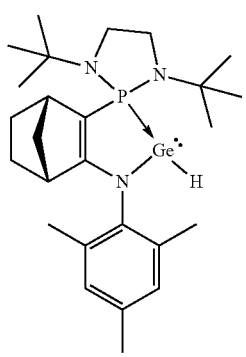
(11)
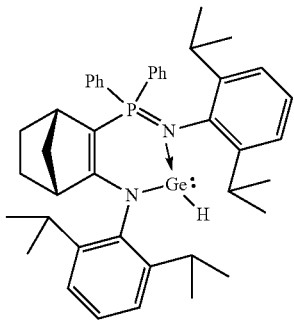
(12)
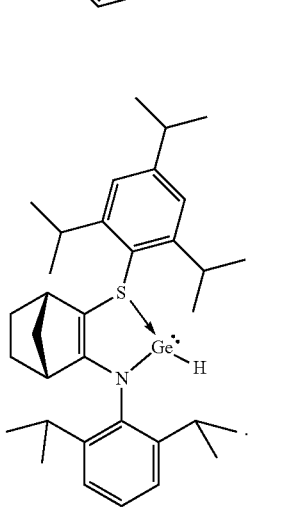
(13)
6. An organic compound according to claim 1, wherein Y is an aryl group containing from 6 to 18 carbon atoms.
7. An organic compound according to claim 1, wherein $R^1$ and $R^2$ are connected via a covalent bond so as to form a ring or a bicycle, which is optionally substituted, containing from 5 to 8 atoms.
\* \* \* \* \*